United States Patent
Sharma et al.

(12)

(10) Patent No.: US 11,605,887 B1
(45) Date of Patent: Mar. 14, 2023

(54) POWER AMPLIFIER BINNING METHOD FOR ELECTRONICALLY STEERED PHASED ARRAY ANTENNAS WITH AMPLITUDE TAPERING

(71) Applicant: Amazon Technologies, Inc., Seattle, WA (US)

(72) Inventors: Sunny Sharma, Shoreline, WA (US); Kaushik Dasgupta, Hillsboro, OR (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 17/112,852

(22) Filed: Dec. 4, 2020

(51) Int. Cl.
*H04B 3/36* (2006.01)
*H01Q 3/28* (2006.01)
*H01Q 3/38* (2006.01)
*H04B 7/185* (2006.01)

(52) U.S. Cl.
CPC .............. *H01Q 3/28* (2013.01); *H01Q 3/38* (2013.01); *H04B 7/18515* (2013.01)

(58) Field of Classification Search
CPC ......... H01Q 3/28; H01Q 3/38; H04B 7/18515
USPC ................................. 375/211, 219, 295, 316
See application file for complete search history.

(56) References Cited

U.S. PATENT DOCUMENTS

| | | | |
|---|---|---|---|
| 9,667,199 B1* | 5/2017 | McLaren | H03F 3/195 |
| 2019/0036215 A1* | 1/2019 | Shahmohammadian | H01Q 3/40 |
| 2019/0132750 A1* | 5/2019 | Yaghmour | H04B 7/18517 |
| 2022/0029462 A1* | 1/2022 | Yang | H02J 50/40 |

\* cited by examiner

*Primary Examiner* — Zewdu A Kassa
(74) *Attorney, Agent, or Firm* — Lowenstein Sandler LLP

(57) ABSTRACT

Technologies directed to binning methods for electronically steered transmit phased arrays with amplitude tapering are described. One communication system includes a first and a second set of power amplifiers. The first set operates with a first peak power level and the second set operates with a second peak power level that is lower than the first peak power level. A digital beamforming (DBF) device sends a first set of signals to the first set of power amplifiers causing the first set of power amplifiers to operate in a first range. The DBF also sends a second set of signals to the second set of power amplifiers causing the second set of power amplifiers to operate in a second range.

20 Claims, 19 Drawing Sheets

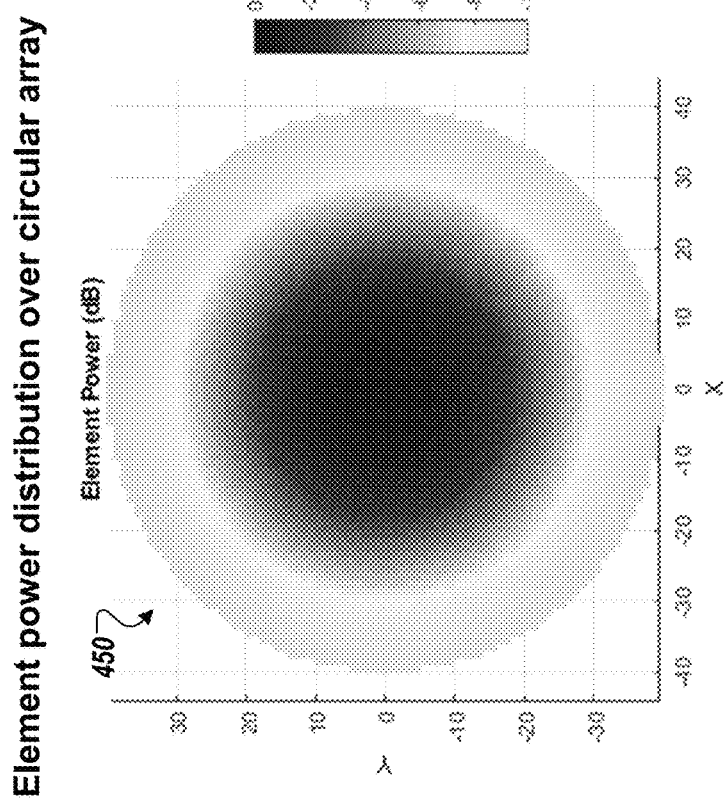
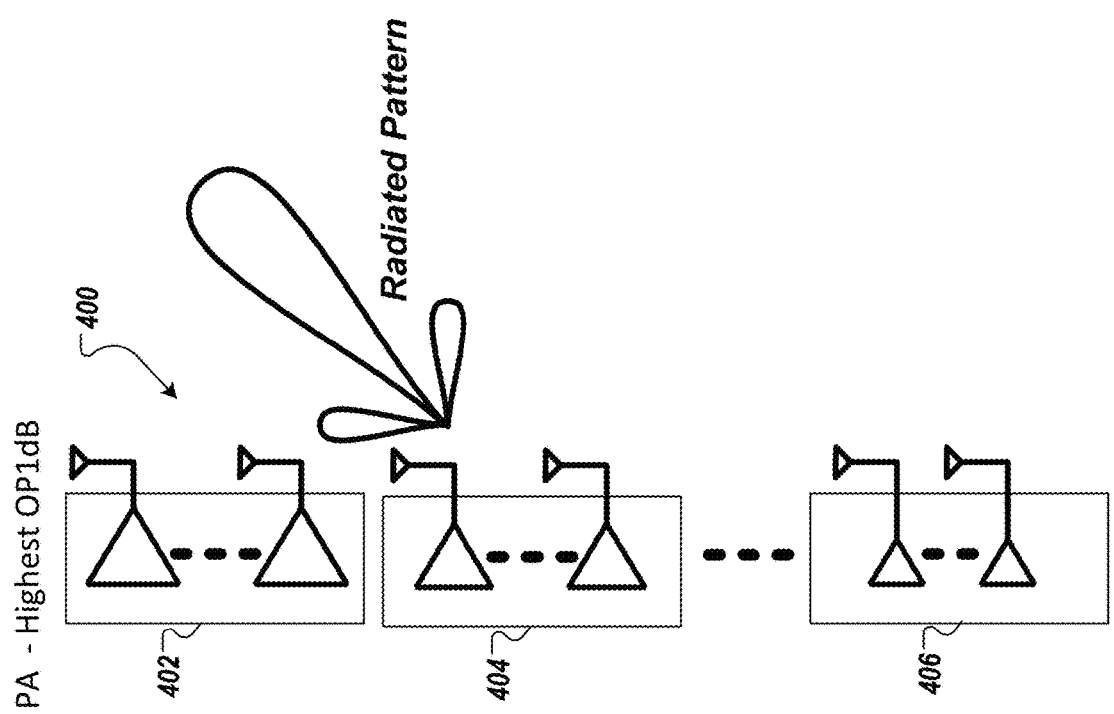
FIG. 4B
FIG. 4A ial media
POWER AMPLIFIER BINNING METHOD FOR ELECTRONICALLY STEERED PHASED ARRAY ANTENNAS WITH AMPLITUDE TAPERING

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4A is a functional diagram of a phased array antenna with N number of power amplifier bins, according to at least one embodiment.

FIG. 4B is a graph of output power distribution over a circular transmit phased array antenna, according to at least one embodiment.

DETAILED DESCRIPTION

Figure 1:
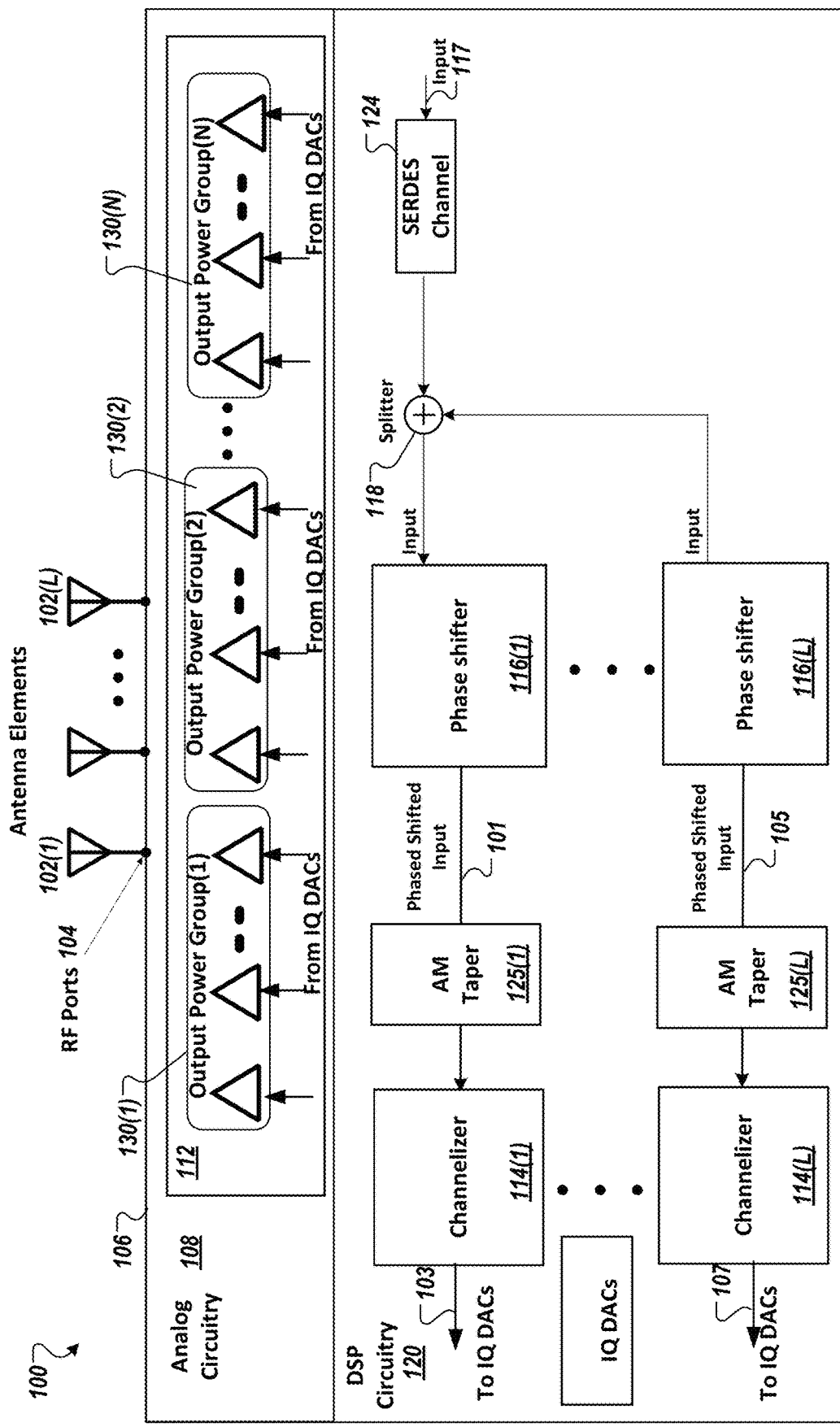
FIG. 1 is a functional diagram of a communication system with digital signal processing (DSP) circuitry with amplitude tapering and multiple output power groups of power amplifiers for multiple output power levels for a transmit phased array antenna, according to at least one embodiment.

Technologies directed to binning methods for electronically steered transmit phased arrays with amplitude tapering are described. In an electronically steered phased array, predictable beam patterns are formed by individually controlling the relative time delay or relative phase shift of the signal between each antenna element. The direction of the transmitted or received electromagnetic energy is also spatially steered by altering the relative time delays or relative phase shift between the antenna elements, resulting in constructive interference in the desired direction and destructive interference in other directions. When a beam arrives or departs at a given scan angle, each antenna element is excited with a relative time delay or relative phase shift to the other antenna elements. Continual advancements in the semiconductor technology have made digital beamforming systems more attractive from both cost and efficiency point of views. Digital beamforming solutions provide ultimate flexibility when constructing multi-beam phased array systems. In such systems, each antenna element is connected to a radio frequency (RF) transceiver and all of the beamforming algorithms and processing logic reside in a digital domain of a beamforming integrated circuit (IC). The relative phase alignment of each transceiver is realized by independent digital phase shifters for each antenna element and beam. A phased array system can support M number of transmit/receive beams. A beamforming IC can be connected to L number of antenna elements and contains L down-conversion and/or L up-conversion chains.

Beam pattern shaping, also referred to as amplitude tapering, in electronically steered phased array antennas can be used to achieve desired side lobe levels, main lobe beam-width and beam scanning performance. That is, in addition to implementing relative phase shifts and time delays between each antenna element, amplitude tapering can provide independent amplitude control to each element in a phased array antenna. Amplitude tapering can be utilized for side lobe reduction at the expense of an increase in the main lobe beam-width. The relative amplitude excitation levels typically decrease as the distance from the center of the array increases. Several algorithms exist to determine the exact amplitude distribution of each element in the array and are usually in some form of a windowing function, such as a Taylor window function. Depending on the chosen amplitude tapering distribution, a range of output power levels can be established.

A typical normalized taper profile for a large antenna array includes a taper range that covers the entire antenna array. A taper range is the difference in output power between an antenna element having a highest power and an antenna element having a lowest power. A taper can be used to minimize side lobes of a radiation pattern. A typical amplitude tampering function, having window coefficients that are used to target −25 dBc side lobe levels, can have a taper range with relative amplitude levels ranging from 0 dB to −9 dB. From another perspective, this implies that average signal levels of power amplifiers driving the antenna elements vary by 9 dB over the entire array. This 9 dB variation is in addition to an output power back-off required to meet a desired link performance, which is directly related to the linearity of the power amplifier for a given modulation and peak-to-average ratios (PAPR) resulting from multi-beam operation. Energy efficiency of a power amplifier degrades rapidly with increasing PAPR, while the linearity improves with more output power back-off. Therein lies the classic efficiency versus linearity tradeoff.

More specifically, a power amplifier (PA) can receive a multi-tone signal at its input, the PA amplifies the signal, and outputs the amplified signal to an antenna element, causing electromagnetic energy to be radiated by the antenna element. When amplifying the signal, a PA can generate intermodulation (IM) interference. When operating in a linear region of the PA, the IM interference is generated at various frequency multiples (e.g., harmonics) of the input signal. However, when the PA approaches a saturation point and enters a non-linear region of operation, the interference increases, lowering the quality or linearity of the output signal. To operate a PA in the linear region of operation, the PA can have a power back-off parameter that is set to a power level that is lower than the saturated level so that the PA operates in the linear region. The back-off parameter can be the amount of output power reduced from a 1 dB compression point, called OP1dB. To ensure maximum panel efficiency, it is desirable to operate every PA as close to its OP1dB as possible. A single PA design that accommodates the entire amplitude taper dynamic range of an entire panel results in the worst panel efficiency. An entire panel is across an aperture of a transmit phased array antenna. On the other hand, distinct PAs for every power level can lead to the best power efficiency but such an arrangement is impractical. Typically, the power efficiency of a PA, as measured as the output power divided by the direct current (DC) power ((Pout/Pdc), degrades as it is backed off from its peak power. As an example, a class A power amplifier only retains about 25% of its peak efficiency when operated at a 6-dB back-off from its peak power. Similarly, class B, AB and C amplifiers also lose significant efficiency when they are not operated near peak output power levels. It is therefore evident that if a single PA design serves all the output power levels in a taper profile of an entire panel, from 0 dB to −9 dB, the efficiency penalty, and hence total DC power penalty, can be quite severe.

Aspects of the present disclosure overcome the deficiencies of conventional systems by providing a balance of multiple PAs that support multiple output power levels and a realistic implementation using a binning strategy with each bin representing a range of output power levels that a PA in the respective bin supports. Embodiments described herein can globally optimize PA energy efficiency, reduce maximum required PA output 1-dB compression point (OP1dB), and improve PA thermal distribution across the phased array panel in active phased arrays employing amplitude tapering for beam shaping. The PAs are subdivided and binned into several (N>1) unique output power groups (also referred to herein as bins) to achieve maximum efficiency while meeting linearity requirements in a single or multi-beam phased array system. Optimal bin values are established by analyzing the efficiency curves of several PAs across the entire phased array along with cumulative linearity performance of each bin at different output power back-off levels. The transmit phased array antenna can be segmented into N groups of PAs targeting power levels derived from effective isotropic radiated power (EIRP) specifications to improve the total efficiency. In addition, output power back-off level of each bin is computed to improve the panel heat distribution and lower the required maximum OP1dB while maintaining the desired linearity performance of the transmit phased array antenna.

Aspects of the present disclosure overcome the deficiencies of conventional systems by providing another level of optimization by using different power back-offs for each of the different bins. This level of optimization is evident from recognizing the linearity and output power back-off tradeoffs for a modulated waveform. Each bin employing the same back-off may not necessarily yield the most energy efficient configuration. When considering the composite non-linearity contribution of all power amplifiers in an amplitude tapered phased array, it is apparent that the bin with the highest EIRP will dominate the linearity performance of the combined phased array transmitter, whereas the bin with the lowest EIRP will contribute the least amount of non-linearity. EIRP is directly proportional to the integrated RF power and the number of antenna elements. Understanding this tradeoff and striking a balance between the output back-off of each bin of power amplifiers and the aggregate linearity of the system can further enhance efficiency gains.

FIG. 1 is a functional diagram of a communication system 100 with DSP circuitry with amplitude tapering and multiple output power groups of power amplifiers for multiple output power levels for a transmit phased array antenna, according to at least one embodiment. Communication system 100 includes a transmit phased array antenna including multiple antenna elements 102 and a digital beamforming (DBF) device 106, which includes analog circuitry 108 and DSP circuitry 110. Analog circuitry 108 can also referred to radio frequency front-end (RFFE) circuitry. Antenna elements 102 may be disposed in an organized formation (e.g. such as formed in a circular pattern, a rectangular pattern, a hexagonal pattern, or the like) on a circuit board or other support structure. Antenna elements 102 are coupled to the DBF device 106, such as to RF ports 104 of the DBF device 106. Each antenna element 102 can be communicatively coupled to individual phase shifters 116 of the DBF device 106 through RF ports 104 and transceiver (transmitter (TX)/receiver (RX)) chains 112. For example, each antenna element 102 is coupled to one of the transceiver chains 112. A TX/RX chain 112 can include up-converters, down-converters, mixers, amplifiers, filters, analog-to-digital converters (ADCs), digital-to-analog converters (DACs), or the like. As illustrated in FIG. 1, TX/RX chains 112 include N number of multiple output power groups 130(1)-130(N), where N is a positive integer that is two or greater. Each of the multiple output power groups 130(1)-130(N) includes multiple power amplifiers. Each power amplifier can be coupled to one or more antenna elements 102(1)-102(L). In some cases, power amplifiers are coupled to the antenna elements 102 in a one-to-one fashion. It should be noted that FIG. 1 is a simplified illustration and the phase shifters 116 may not be directly coupled to the RF ports 104. For example, the DSP circuitry 110 can include one or more data paths, one or more data buffers, or the like to store digital data generated by digital-to-analog converters (DACs) in analog circuitry 108. For example, DSP circuitry 110 can include one or more DACs that receive digital signals from the phase shifters and convert the digital signals into analog voltage signals that are amplified by the power amplifiers of the multiple output power groups 130(1)-130(N). As described herein, the multiple output power groups 130(1)-130(N) can provide different output power levels.

DSP circuitry 110 can include one or more channelizers 114, one or more DSP blocks, and serializer/deserializer (SERDES) circuitry 124, the DSP blocks including multiple phase shifters, a splitter, and an amplitude taper block. The DSP blocks can include other processing blocks. The DSP blocks can be scaled for the number of channels, the number of beams, and the number of antenna elements. The DSP blocks of DSP circuitry 110 can each be implemented as a processing element of the DBF device 106, such as a discrete component, a discrete circuit, logic circuitry, a digital functional block, a programmable block, such as a DSP functional block, or the like. These DSP blocks can be allocated on a per channel basis and can be scaled for one or more beams as described herein. A simplified portion of DSP circuitry 110 is illustrated in FIG. 1. These DSP blocks can be implemented in a digital domain of the DBF device 106. DBF device can include processing logic for amplitude tapering electromagnetic energy radiated by the array antenna.

In some embodiments, SERDES circuitry 124 can receive input data 117 from a second DBF device or a modem. SERDES circuitry 124 can provide the input data 117 to splitter 118 and the splitter 118 provide input data into each of the phase shifters 116. A phase shifter 116 applies a phase shift to the subbeams of the signal to be transmitted. For example, phase shifters 116 may apply a relative phase shift to each subbeam such that each signal of the total outgoing signal corresponds to a direction of transmission. The relative phase shift may be associated with the variable path length of the signal across each of the antenna elements 102. The relative phase shift for an individual phase shifter 116 may be associated with the spatial location of an associated antenna element 102 of the array antenna.

In some embodiments, a phase shifter 116 is associated with multiple antenna elements 102. For example, a DBF device 106 may include one phase shifter 116 that is coupled to transmit signals for multiple antenna elements 102 of the DBF device 106. As noted above, the phase shifter 116 is not necessarily coupled to an antenna element 102. For example, there can be an up-conversion chain, including a digital-to-analog converter and a power amplifier, before a signal gets to the antenna element 102. Each phase shifter 116 may shift the phase of signals transmitted by multiple antenna elements 102. In another example, a DBF device 106 may include a phase shifter 116 for each antenna element such that each phase shifter 116 is associated only with an individual antenna element 102 of the array antenna.

In embodiments where channelizers are used, each multipoint channelizer can process digital data corresponding to one of the antenna elements 102 according to P number of channels, where P is a positive integer. As illustrated in FIG. 1, there can be L number of channelizers, where L corresponds to a number of antenna elements 102. For a first channel, a first channelizer 114(1) can process first phase-shifted data 101 from a first phase shifter 116(1) and outputs first data 103 and a second channelizer 114(L) can process phase shifted data 105 and outputs second data 107. The first channelizer 114(1) can receive data from multiple phase shifters 116, one for each channel, and can combine the data into the first data 103. Similarly, the second channelizer 114(L) can receive data from multiple phase shifters, one of reach channel, and can combine the data into the second data 107. Although splitter can split a signal for a single channel (e.g., a first channel), another splitter can be used to split a second signal for a second channel (e.g., second channel). Each of the signals for a channel can be aggregated by the channelizer 114 before being converted to analog signals to be transmitted by analog circuitry 108 and antenna elements 102. The phase compensated signal may be sent to antenna elements 102 through RF ports 104 by analog circuitry 108. The antenna elements 102 may transmit the signal at a transmission angle. The transmission angle may be associated with the relative phase shifting of phase shifters 116 (1)-116(L).

In one embodiment, SERDES circuitry 124 can send to DSP blocks for a set of M beams. SERDES circuitry 124 converts data between parallel interfaces and serial data in each direction. SERDES circuitry 124 can receive data over a single line or a differential pair in order to minimize a number of interconnects between circuits. SERDES circuitry 124 can communicate data with a second DBF device or a modem.

In some embodiments, digital data includes an in-phase component and a quadrature component. In these embodiments, phase shifters 116 can phase shift both the in-phase component and the quadrature component. The splitter 118 can include two separate splitters to split the respective in-phase components for each of the other phase shifters. Similarly, SERDES circuitry 124 can include separate channels for the in-phase components and quadrature components.

It should be noted that although various figures and embodiments describe a transmitter, in other embodiments, the communication system 100 may operate as a transceiver or a receiver with all the elements effectively operating in reverse. In the receiver embodiment, the splitter 118 may act as a combiner that receives signals from each of the phase shifters that adjust the relative phase shift between subbeams.

In other embodiments, an amplitude (AM) taper 125 can be coupled to channelizer 114 and can apply an amplitude shaping function to the signal in each channel. In some embodiments, the AM taper 125 applies a weighting function to adjust the amplitude of the signal of each channel. For example, the AM taper may apply an amplitude shaping function to reduce the side lobe levels of the signal of each channel and increase the main lobe beamwidth of the signal of each channel. In another example, the AM taper 125 may provide an amplitude shaping function to improve the directivity of the signal from the array antenna. AM taper 125 can implement an algorithm to determine the exact amplitude distribution of each antenna element 102 in the array and are usually in some form of a windowing function, such as a Taylor window function, such as illustrated in FIG. 2.

Figure 2:
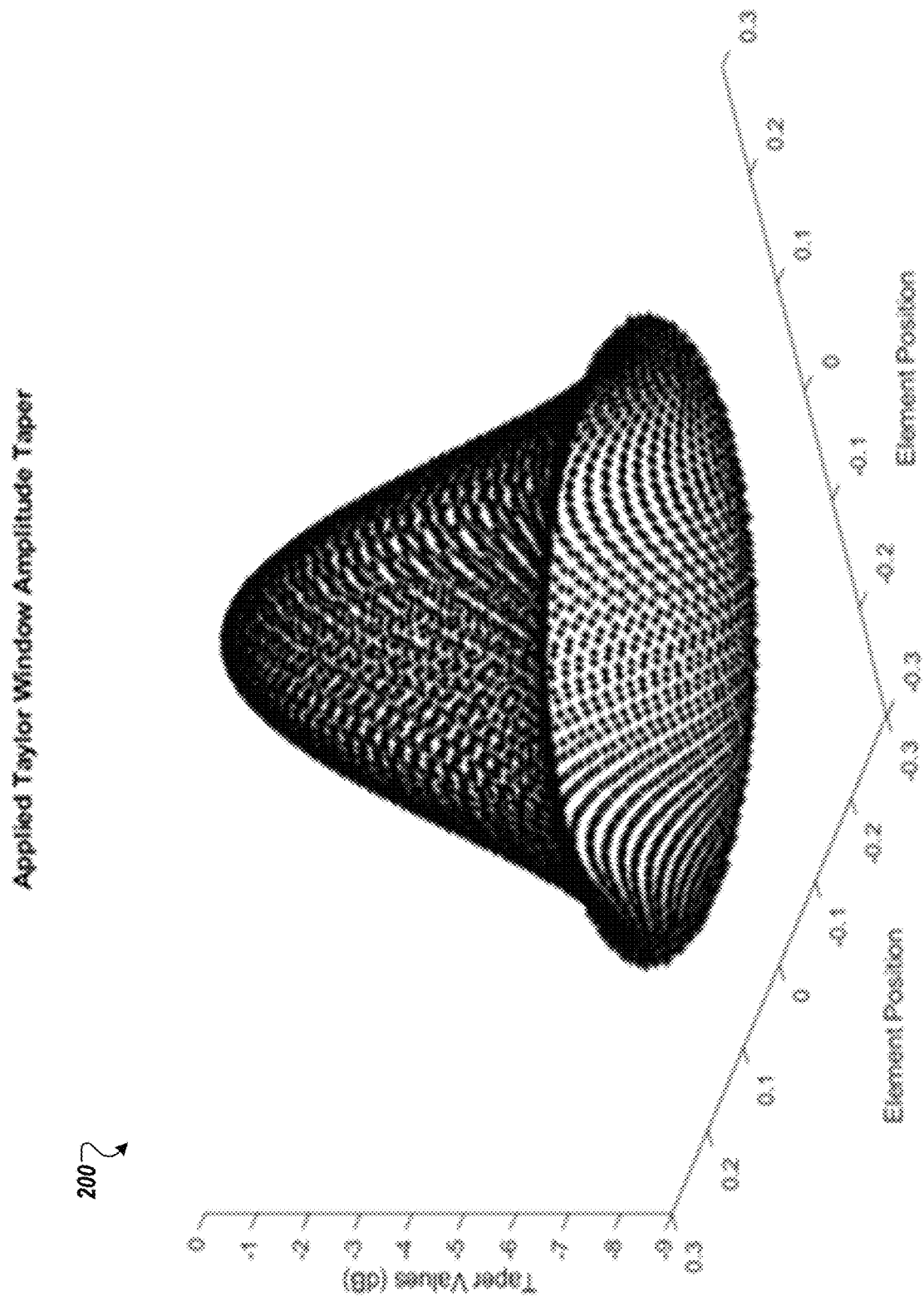
FIG. 2 is a plot of a Taylor-windowed amplitude taper applied to a transmit phased array antenna depicting relative amplitude levels of each element of the transmit phased array antenna.

FIG. 2 is a plot of a Taylor-windowed amplitude taper 200 applied to a transmit phased array antenna depicting relative amplitude levels of each element of the transmit phased array antenna. Depending on the chosen amplitude tapering distribution, a range of output power levels can be established in connection with the windowing function. As described above, a typical amplitude tampering function, having window coefficients that are used to target −25 dBc side lobe levels, can have a taper range with relative amplitude levels ranging from 0 dB to −9 dB.

Figure 3:
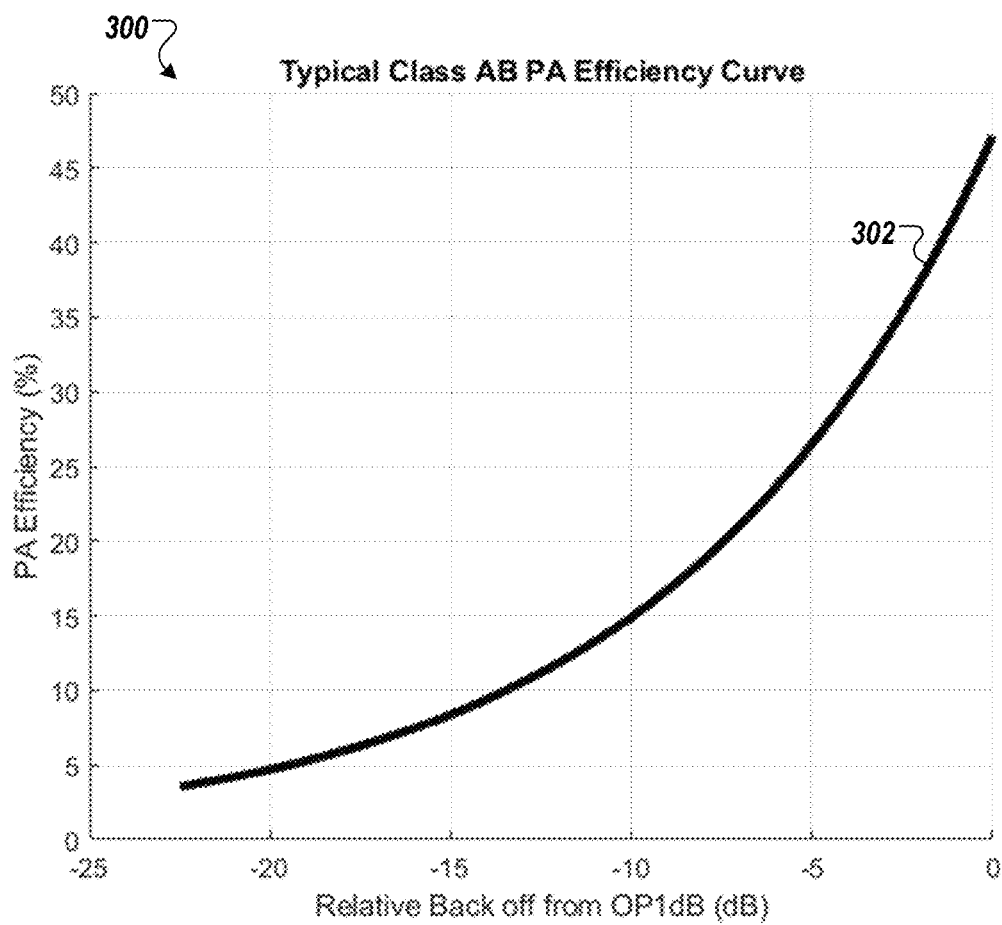
FIG. 3 is a graph of a Class AB power amplifier efficiency curve as a function of relative output power back-off from 1-dB output power compression point.

As described above, energy efficiency of a power amplifier degrades rapidly with increasing output power back-off, such as illustrated in FIG. 3, while the linearity improves with more output power back-off. FIG. 3 is a graph 300 of a Class AB power amplifier efficiency curve 302 as a function of relative output power back-off from 1-dB output power compression point. As illustrated in graph 300, when the output power back-off is −9 dB, PA efficiency is around 15%.

Referring back to FIG. 1, using multiple output power groups 130, all of the output power groups 130 can collectively have a taper range with relative amplitude levels ranging from 0 dB to −9 dB and each of the output power groups 130 can individually have a taper subrange with a subset of the range from 0 dB to −9 dB. These subset variations can be in addition to an output power back-off required to meet a desired link performance, which is directly related to the linearity of the power amplifier for a given modulation and PAPR resulting from multi-beam operation. Since energy efficiency of a power amplifier degrades rapidly with increasing output power back-off and the linearity improves with increasing output power back-off, the multiple output power groups 130 can balance efficiency and linearity.

In one embodiment, the power amplifiers are segmented into N number of groups, each group corresponding to a power level derived from effective isotropic radiated power (EIRP) specifications. By grouping the power amplifiers, a total power efficiency can be improved. In one embodiment, a first output power group 130(1) includes a first set of power amplifiers, each being coupled to one of the antenna elements 102. The first set of power amplifiers can have or can operate with a first peak power level. A second output power group 130(2) includes a second set of power amplifiers, each being coupled to one of the antenna elements 102. The second set of power amplifiers can have or can operate with a second peak power level that is lower than the first peak power level. A third output power group 130(N) includes a third set of power amplifiers, each being coupled to one of the antenna elements 102. The third set of power amplifiers can have or can operate with a third peak power level that is lower than the second peak power level. In another embodiment, the first set of power amplifiers can operate in a first power range, the second set of power amplifiers can operate in a second power range, and the third set of power amplifiers can operate in a third power range. In one embodiment, at least some of the second power range is less than at least some of the first power range. That is, the first power range and the second power range can overlap. In another embodiment, the second power range is less than the first power range and the first power range and the second power range do not overlap. Similarly, the third power range can be less than the second power range in overlapping or non-overlapping fashion.

In another embodiment, the first output power group 130(1) includes a first type of PAs, whereas the second output power group 130(2) includes a second type of PAs that is different than the first type of PAs. Similarly, the third output power group 130(N) includes a third type of PAs that is different than the second type and the first type of PAs. The different types of PAs can have different peak power levels and can have optimized power back-off levels to serve the entire taper range of the entire panel. Alternatively, the different types of PAs can have different peak power levels and each group can use an individually optimized power back-off levels to serve a subset of the entire taper range.

During operation, DSP circuitry 120 of DBF device 106 can apply a first set of weights of an amplitude weighting function to signals sent to the first set of power amplifiers. The first set of weights causes the first set of power amplifiers to operate in a first taper range. The first taper range corresponds to a difference value between a highest output power level and a lowest output power level by the first set of power amplifiers. The amplitude weighting function can be a windowing function that controls an amplitude distribution of each element in the array. In one embodiment, the windowing function is a Taylor window function, such as illustrated in FIG. 2. The windowing function is used in connection with the multiple output power groups 130, each having different peak power levels. DSP circuitry 120 can apply a second set of weights of the amplitude weighting function to signals sent to the second set of power amplifiers. The second set of weights causes the second set of power amplifiers to operate in a second taper range. The second taper range corresponds to a difference value between a highest output power level and a lowest output power level by the second set of power amplifiers. DSP circuitry 120 can apply a third set of weights of the amplitude weighting function to signals sent to the third set of power amplifiers. The third set of weights causes the third set of power amplifiers to operate in a third taper range. The third taper range corresponds to a difference value between a highest output power level and a lowest output power level by the third set of power amplifiers.

In a further embodiment, the first set of power amplifiers can include a power back-off parameter that is set to a first level, the second set of power amplifiers can include a power back-off parameter that is set to a second level, and the third set of power amplifiers can include a power back-off parameter that is set to a third level. The power back-off parameter can be an amount of power that a power amplifier can be reduced from a gain compression parameter, called OP1dB, which is the power input that results in a 1 dB compression. For example, the first set of power amplifiers (e.g., Bin 1) is backed off 4 dB from OP1dB, the second set of power amplifiers (e.g., Bin 2) is backed off 5.7 dB from OP1dB, and the third set of power amplifiers (e.g., Bin 3) is backed off 6.6 dB from OP1dB. In some embodiment, the first power level, the second power level, and the third power level are different power levels. In other embodiments, the same power back-off parameter can used for all of the bins of power amplifiers as described herein. In another embodiment, DSP circuitry 120 can determine a PA peak power and the power value required for the taper and can control the PAPR.

FIG. 4A is a functional diagram of a phased array antenna 400 with N number of power amplifier bins, according to at least one embodiment. The phased array antenna 400 includes multiple antenna elements, each antenna element being coupled to a power amplifier of one of the N number of power amplifier bins. A first bin ($B_0$) of power amplifiers 402 can operate at a first peak power level. A second bin ($B_1$) of power amplifiers 404 can operate at a second peak power level. An Nth bin ($B_N$) of power amplifiers 406 can operate at an Nth peak power level. The N number of power amplifier bins amplifies signals sent to the antenna elements of the phased array antenna 400 and the antenna elements radiate electromagnetic energy in a radiation pattern 408. The first bin of power amplifiers 402 can have a highest OP1dB, whereas the Nth bin of power amplifiers 406 can have a lowest OP1dB. By organizing the power amplifiers into separate bins with different peak power levels, an element power distribution over an array for the radiation pattern 408 can be improved, such as illustrated in FIG. 4B.

FIG. 4B is a graph 450 of output power distribution over a circular transmit phased array antenna, according to at least one embodiment. In this embodiment, the antenna elements are organized in a circular layout and the first bin of power amplifiers 402 are coupled to antenna elements that are closer to the center of the circular layout, whereas the Nth bin of power amplifiers 406 are located near the perimeter of the circular layout. As illustrated in graph 450, the first bin of power amplifiers 402 operate at a higher OP1dB than the Nth bin of power amplifiers 406.

In one embodiment, the PAs across the required taper range are binned into N bins and each bin serves a smaller power range with a same power back-off as described above and with different power back-offs as described below with respect to FIG. 7B, thus maximizing efficiency, reducing maximum OP1dB required, and improving the thermal gradient across the panel, such as illustrated in FIG. 4B. The number of bins and their respective power levels are parameters which can be optimized based on a) taper range, b) single PA efficiency versus power back-off, and c) required Error Vector Magnitude (EVM) and Adjacent Channel Leakages Power Ratio (ACLR) specifications. Examples of different number of bins and same power back-off levels are illustrated and described below with respect to FIGS. 5A-6B.

Figure 5A:
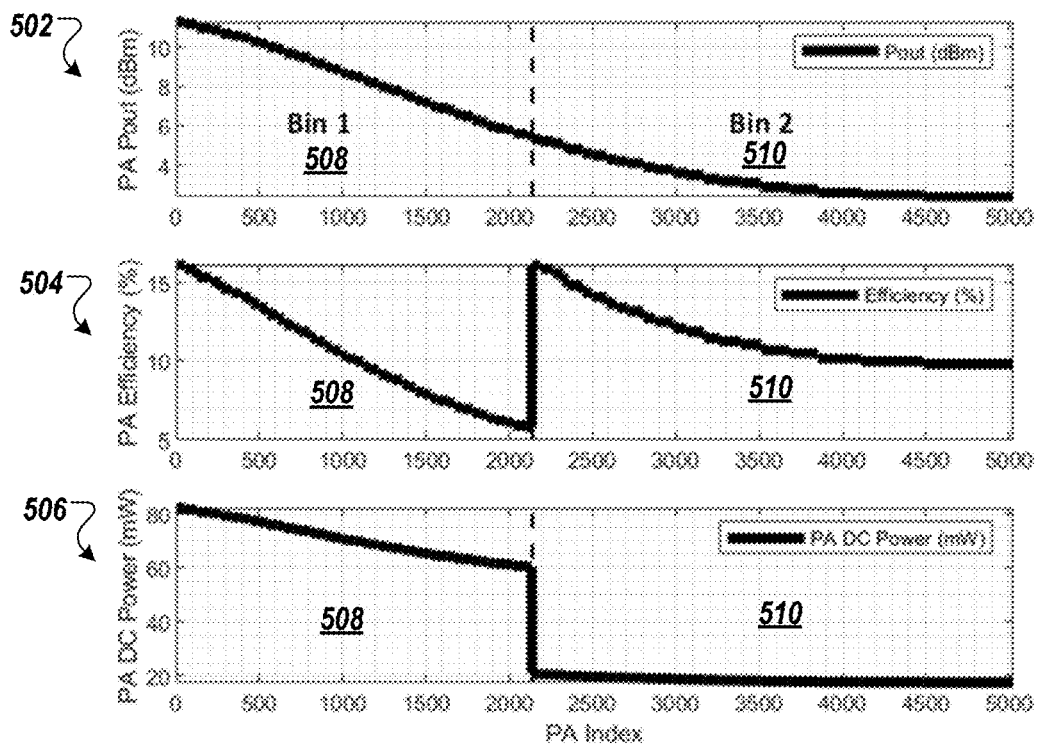
FIG. 5A are graphs of output power, average efficiency, and direct current (DC) power consumption for all power amplifiers, organized in two bins, for a transmit phased array antenna, according to at least one embodiment.

FIG. 5A are graphs of output power, average efficiency, and DC power consumption for all power amplifiers, organized in two bins, for a transmit phased array antenna, according to at least one embodiment. In these examples, the transmit phased array antenna includes 5024 antenna elements and power amplifiers organized in 2 bins. Graph 502 is a plot of output power (hereinafter output power 502) of the power amplifiers. Graph 504 is a plot of average efficiency of the power amplifiers (hereinafter average efficiency 504). Graph 506 is a plot of DC power consumption for all the PAs (hereinafter DC power consumption 506). In this embodiment, the 5024 antenna elements are split into two bins with more than half of the power amplifiers in a first bin 508 and the remaining power amplifiers in a second bin 510. The output power 502 is decreased over an entire taper range. The entire taper range has two sub-ranges, one for each bin. The output power 502 for a highest power amplifier in the first bin 508 is at approximately 12 dBm and the output power 502 for a lowest power amplifier in the first bin 508 is at approximately 7 dBm. The output power 502 for a highest power amplifier in the second bin 510 is at approximately 7 dBm and the output power 502 for a lowest power amplifier in the second bin 510 is at approximately 0 dBm. The average efficiency 504 over the first bin 508 decreases from approximately 16% down to approximately 7% and the average efficiency 504 over the second bin 510 decreases from approximately 16% down to approximately 10%. A highest power amplifier in the second bin 510 has a higher efficiency than a lowest power amplifier in the first bin 508. The PA DC power consumption 506 over the first bin 508 decreases from approximately 80 mW down to approximately 60 mW and the PA DC power consumption 506 drops to approximately 20 mW for most of power amplifiers in the second bin 510. In this embodiment, two PA bins operate under equal power back-off of 6 dB from OP1dB of the highest PA in the respective bins. In this embodiment, the power amplifiers consume 204 watts of DC power.

Figure 5B:
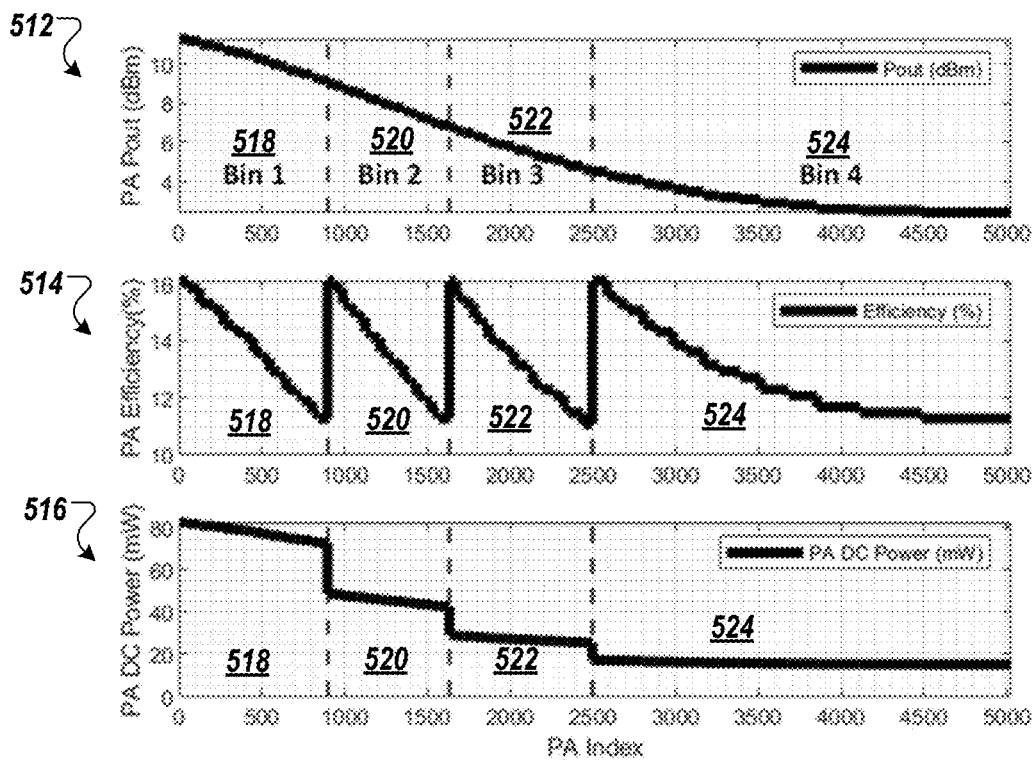
FIG. 5B are graphs of output power, average efficiency, and DC power consumption for all power amplifiers, organized in four bins, for a transmit phased array antenna, according to at least one embodiment.

FIG. 5B are graphs of output power, average efficiency, and DC power consumption for all power amplifiers, organized in four bins, for a transmit phased array antenna, according to at least one embodiment. In these examples, the transmit phased array antenna includes 5024 antenna elements and power amplifiers organized in 4 bins. Graph 512 is a plot of output power of the power amplifiers (hereinafter output power 512). Graph 514 is a plot of average efficiency of the power amplifiers (hereinafter average efficiency 514). Graph 516 is a plot of DC power consumption for all the PAs (hereinafter DC power consumption 516).

In this embodiment, the 5024 antenna elements are split into four bins: first bin 518, second bin 520, third bin 522, and fourth bin 524. The output power 512 is decreased over an entire taper range. The entire taper range has four sub-ranges, one for each bin. The output power 512 for a highest power amplifier in the first bin 518 is at approximately 12 dBm and the output power 512 for a lowest power amplifier in the first bin 518 is at approximately 9 dBm. The output power 512 for a highest power amplifier in the second bin 520 is at approximately 9 dBm and the output power 512 for a lowest power amplifier in the second bin 520 is at approximately 7 dBm. The output power 512 for a highest power amplifier in the third bin 522 is at approximately 7 dBm and the output power 512 for a lowest power amplifier in the third bin 522 is at approximately 4.5 dBm. The output power 512 for a highest power amplifier in the fourth bin 524 is at approximately 4.5 dBm and the output power 512 for a lowest power amplifier in the second bin 524 is at approximately 0 dBm.

The average efficiency 514 over the first bin 518 decreases from approximately 16% down to approximately 7%, the average efficiency 514 over the second bin 520 decreases from approximately 16% down to approximately 7%, the average efficiency 504 over the third bin 520 decreases from approximately 16% down to approximately 7%, and the average efficiency 504 over the fourth bin 520 decreases from approximately 16% down to approximately 7%. A highest power amplifier in the second bin 520 has a higher efficiency than a lowest power amplifier in the first bin 518. The highest power amplifier in the third bin 522 has a higher efficiency than a lowest power amplifier in the second bin 520. The highest power amplifier in the fourth bin 524 has a higher efficiency than a lowest power amplifier in the third bin 522.

The DC power consumption 516 over the first bin 518 decreases from approximately 80 mW down to approximately 70 mW. The PA DC power consumption 516 over the second bin 518 decreases from approximately 50 mW down to approximately 40 mW. The PA DC power consumption 516 over the third bin 522 decreases from approximately 30 mW down to approximately 25 mW. The PA DC power consumption 516 drops to approximately 15 mW for most of power amplifiers in the fourth bin 524. In this embodiment, four PA bins operate under equal power back-off of 6 dB from OP1dB of the highest PA in the respective bins. In this embodiment, the power amplifiers consume 166 watts of DC power for the same radiated power as the two bin configuration of FIG. 5A. This highlights the energy benefits of having larger number of bins at the cost of design overhead of multiple PAs.

Figure 6A:
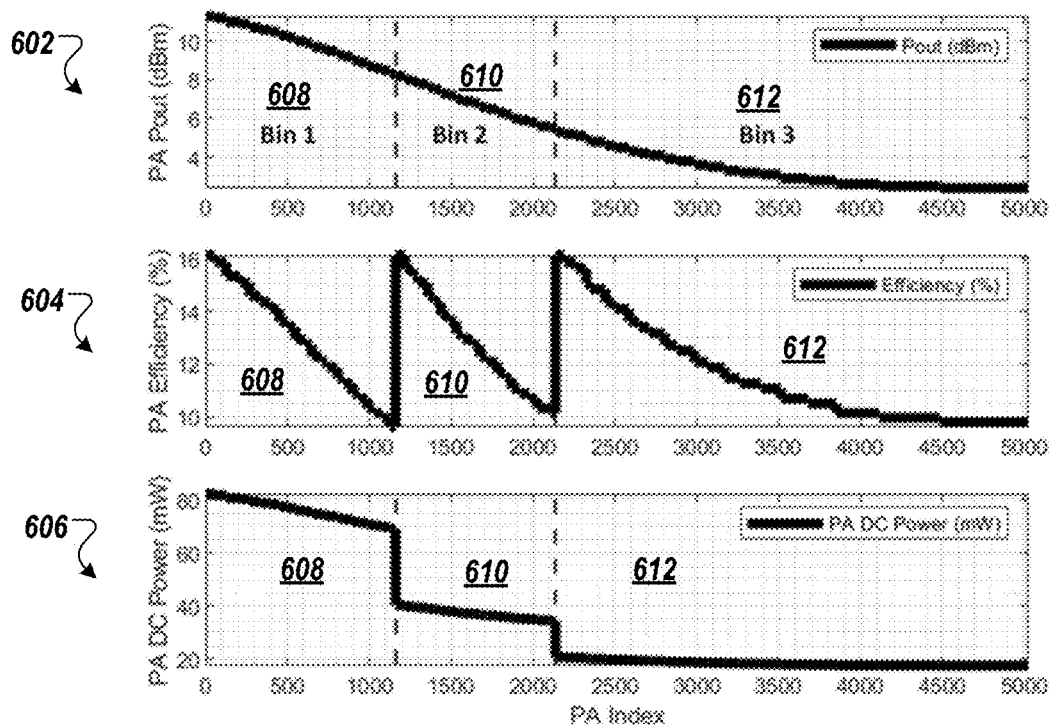
FIG. 6A are graphs of output power, average efficiency, and DC power consumption for all power amplifiers, organized in three bins with a first set of power back-off parameters, for a transmit phased array antenna, according to at least one embodiment.

FIG. 6A are graphs of output power, average efficiency, and DC power consumption for all power amplifiers, organized in three bins with a first set of power back-off parameters, for a transmit phased array antenna, according to at least one embodiment. In these examples, the transmit phased array antenna includes 5024 antenna elements and power amplifiers organized in 3 bins. Graph 602 is a plot of output power of the power amplifiers (hereinafter output power 602). Graph 604 is a plot of average efficiency of the power amplifiers (hereinafter average efficiency 604). Graph 606 is a plot of DC power consumption for all the PAs (hereinafter DC power consumption 606).

In this embodiment, the 5024 antenna elements are split into three bins: first bin 608, second bin 610, and third bin 612. The output power 602 is decreased over an entire taper range. The entire taper range has three sub-ranges, one for each bin. The output power 602 for a highest power amplifier in the first bin 608 is at approximately 12 dBm and the output power 512 for a lowest power amplifier in the first bin 608 is at approximately 8 dBm. The output power 602 for a highest power amplifier in the second bin 610 is at approximately 8 dBm and the output power 602 for a lowest power amplifier in the second bin 610 is at approximately 7 dBm. The output power 602 for a highest power amplifier in the third bin 612 is at approximately 7 dBm and the output power 602 for a lowest power amplifier in the third bin 522 is at approximately 0 dBm. In this embodiment, the output power levels of the high-power PAs in the first bin 608 span from approximately 11.3 to 8.3 dBm, the output power levels of the mid-power PAs in the second bin 610 span from approximately 8.2-5.5 dBm, and the output power levels of the low-power PAs in the third bin 612 span from approximately 5.3 to 2.4 dBm.

The average efficiency 604 over the first bin 608 decreases from approximately 16% down to approximately 10%, the average efficiency 604 over the second bin 610 decreases from approximately 16% down to approximately 10%, the average efficiency 604 over the third bin 612 decreases from approximately 16% down to approximately 10%. A highest power amplifier in the second bin 610 has a higher efficiency than a lowest power amplifier in the first bin 608. The highest power amplifier in the third bin 612 has a higher efficiency than a lowest power amplifier in the second bin 610.

The PA DC power consumption 606 over the first bin 608 decreases from approximately 80 mW down to approximately 70 mW. The PA DC power consumption 606 over the second bin 610 decreases from approximately 40 mW down to approximately 35 mW. The PA DC power consumption 606 over the third bin 612 is approximately 20 mW. In this embodiment, three PA bins operate under equal power back-off of 6 dB from OP1dB of the highest PA in the respective bins. In this embodiment, the power amplifiers consume 177 watts of DC power.

Figure 6B:
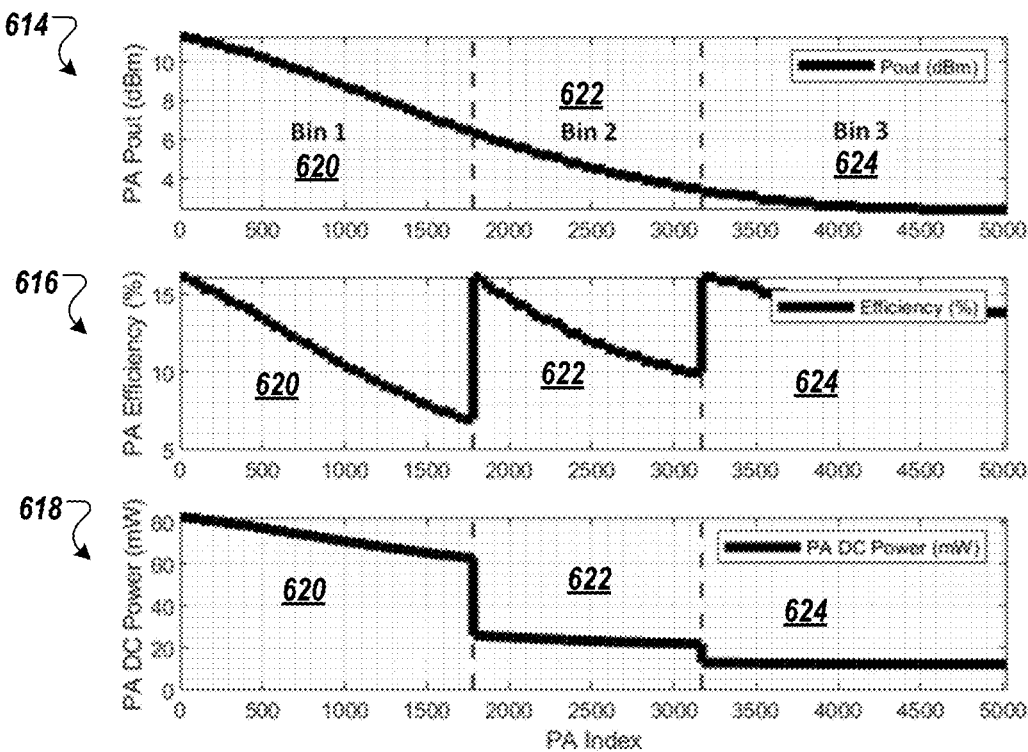
FIG. 6B are graphs of output power, average efficiency, and DC power consumption for all power amplifiers, organized in three bins with a first set of power back-off parameters, for a transmit phased array antenna, according to at least one embodiment.

FIG. 6B are graphs of output power, average efficiency, and DC power consumption for all power amplifiers, organized in three bins with a first set of power back-off parameters, for a transmit phased array antenna, according to at least one embodiment. In these examples, the transmit phased array antenna includes 5024 antenna elements and power amplifiers organized in 3 bins. Graph 614 is a plot of output power of the power amplifiers. Graph 616 is a plot of average efficiency of the power amplifiers. Graph 618 is a plot of DC power consumption for all the PAs.

In this embodiment, the 5024 antenna elements are split into three bins: first bin 620, second bin 622, and third bin 624. The output power 614 is decreased over an entire taper range. The entire taper range has three sub-ranges, one for each bin. The output power 614 for a highest power amplifier in the first bin 620 is at approximately 12 dBm and the output power 614 for a lowest power amplifier in the first bin 620 is at approximately 6 dBm. The output power 614 for a highest power amplifier in the second bin 622 is at approximately 8 dBm and the output power 614 for a lowest power amplifier in the second bin 622 is at approximately 3 dBm. The output power 614 for a highest power amplifier in the third bin 624 is at approximately 3 dBm and the output power 614 for a lowest power amplifier in the third bin 624 is at approximately 0 dBm. In this embodiment, the output power levels of the high-power PAs in the first bin 608 span from approximately 11.3 to 6.5 dBm, the output power levels of the mid-power PAs in the second bin 610 span from approximately 6.3 to 3.5 dBm, and the output power levels of the low-power PAs in the third bin 612 span from approximately 3.3 to 2.4 dBm.

The average efficiency 616 over the first bin 620 decreases from approximately 16% down to approximately 7%, the average efficiency 616 over the second bin 622 decreases from approximately 16% down to approximately 10%, the average efficiency 616 over the third bin 624 decreases from approximately 16% down to approximately 14%. A highest power amplifier in the second bin 622 has a higher efficiency than a lowest power amplifier in the first bin 620. The highest power amplifier in the third bin 612 has a higher efficiency than a lowest power amplifier in the second bin 610.

The PA DC power consumption 618 over the first bin 620 decreases from approximately 80 mW down to approximately 60 mW. The PA DC power consumption 618 over the second bin 622 decreases from approximately 30 mW down to approximately 25 mW. The PA DC power consumption 618 over the third bin 624 is approximately 15 mW. In this embodiment, three PA bins operate under equal power back-off of 6 dB from OP1dB of the highest PA in the respective bins. In this embodiment, the power amplifiers consume 185 watts of DC power.

Although both embodiments include three bins, the three bins in FIG. 6A are organized such that more than half of the power amplifiers are part of the third bin 612, whereas the three bins in FIG. 6B are organized such that the three bins are balanced. These examples show that there exists an optimum bin sizing for minimum panel energy consumption for a given number of PA bins.

Figure 7A:
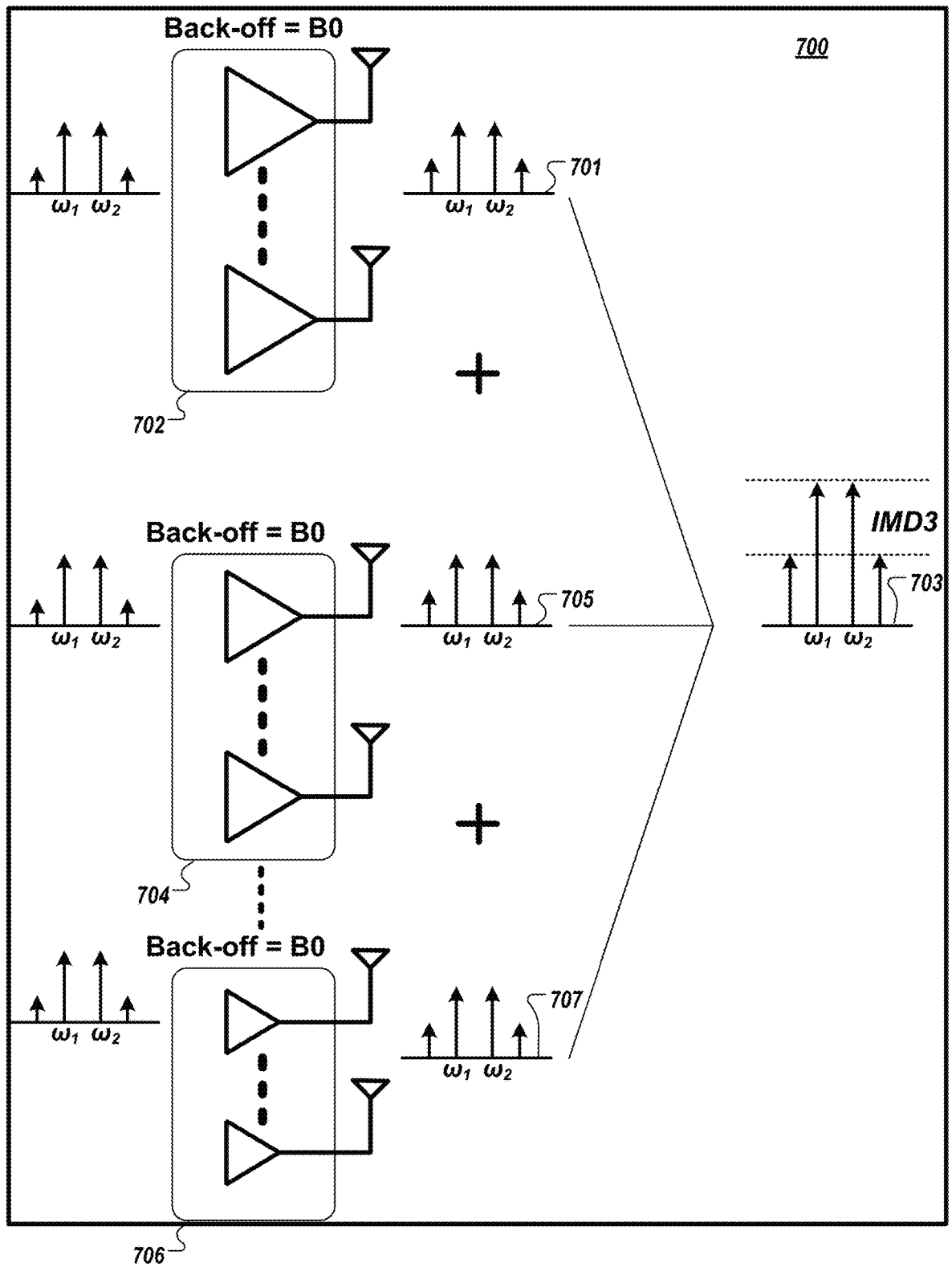
FIG. 7A is a functional diagram of a phased array antenna with N number of power amplifier bins with a same power back-off parameter for all N bins, according to at least one embodiment.

In some cases, the phased array implementation with N PA bins that are optimized to serve various power levels across the antenna taper profile can be designed to have power back-off parameters to meet EVM and ACLR requirements. In one embodiment, the PAs across the required taper range are binned into N bins and each bin serves a smaller power range with a same back-off, thus maximizing efficiency, reducing maximum OP1dB required, and improving the thermal gradient across the panel, such as illustrated in FIG. 7A. In this example, all PAs in the N bins are backed off exactly the same power back-off parameter (B0 in FIG. 7A). This leads to a composite nonlinearity qualified here by 3rd order distortion as IMD3. While this solution can satisfy overall nonlinearity requirements, it may not be the optimum for DC power consumption or thermal distribution across the panel. In another embodiment, the PAs across the required taper range are binned into N bins and each bin serves a smaller power range with a different back-off, thus maximizing efficiency, reducing maximum OP1dB required, and improving the thermal gradient across the panel, such as illustrated in FIG. 7B. In this example, the bins have different back offs (B1, B2, BN and B1<B2<... BN in FIG. 7B) and each bin produces different non-linear components. For the ith bin with Bi>B0 the non-linear distortion is lower than the default case with B0 back-off, while for jth Bin with Bj<B0 the distortion can be higher than the B0 default case. The overall non-linear distortion at the output can still be the same as in FIG. 7A. However, the total DC power consumption now can now be optimized while maintaining the same IMD3 level leading to an optimum binning matrix [B1opt, B2opt, ... ].

FIG. 7A is a functional diagram of a phased array antenna 700 with N number of power amplifier bins with a same power back-off parameter for all N bins, according to at least one embodiment. The phased array antenna 700 includes a first bin 702 with multiple power amplifiers, each coupled to an antenna element. The power amplifiers of the first bin 702 can receive a multi-tone signal at its input and outputs an amplified signal to the antenna elements, causing electromagnetic energy to be radiated by the antenna elements. When amplifying the signal, PAs in the first bin 702 can generate IM interference components 701 that are summed with other IM interference components from other bins of power amplifiers to generate a signal with multiple distortion components 703 (as labeled with IMD3). The phased array antenna 700 includes a second bin 704 with multiple power amplifiers that operate at a different power level than the first bin 702. The power amplifiers of the second bin 704 can receive the multi-tone signal at its input and outputs an amplified signal to the antenna elements, causing electromagnetic energy to be radiated by the antenna elements. When amplifying the signal, PAs in the second bin 704 can generate IM interference components 705 that are summed with other IM interference components. The phased array antenna 700 includes an Nth bin 706 with multiple power amplifiers that operate at a different power level than the first bin 702 and second bin 704. Similarly, the power amplifiers of the Nth bin 706 can receive the multi-tone signal and cause electromagnetic energy to be radiated by the antenna elements. When amplifying the signal, PAs in the Nth bin 706 can generate IM interference components 707 that are summed with other IM interference components.

As described above, to operate a PA in the linear region of operation, the PA can have a power back-off parameter that is set to a power level that is lower than the saturated level so that the PA operates in the linear region. Power back-off parameter is the amount by which the power level of the PA is reduced. The back-off parameter can be the amount of output power reduced from OP1dB. To ensure maximum panel efficiency, it is desirable to operate every PA as close to its OP1dB as possible. In some cases, each of the bins are set to have the same back-off parameters, such as illustrated in FIG. 7A. In other cases, each of the bins can be set to have different back-off parameters, such as illustrated in FIG. 7B.

Figure 7B:
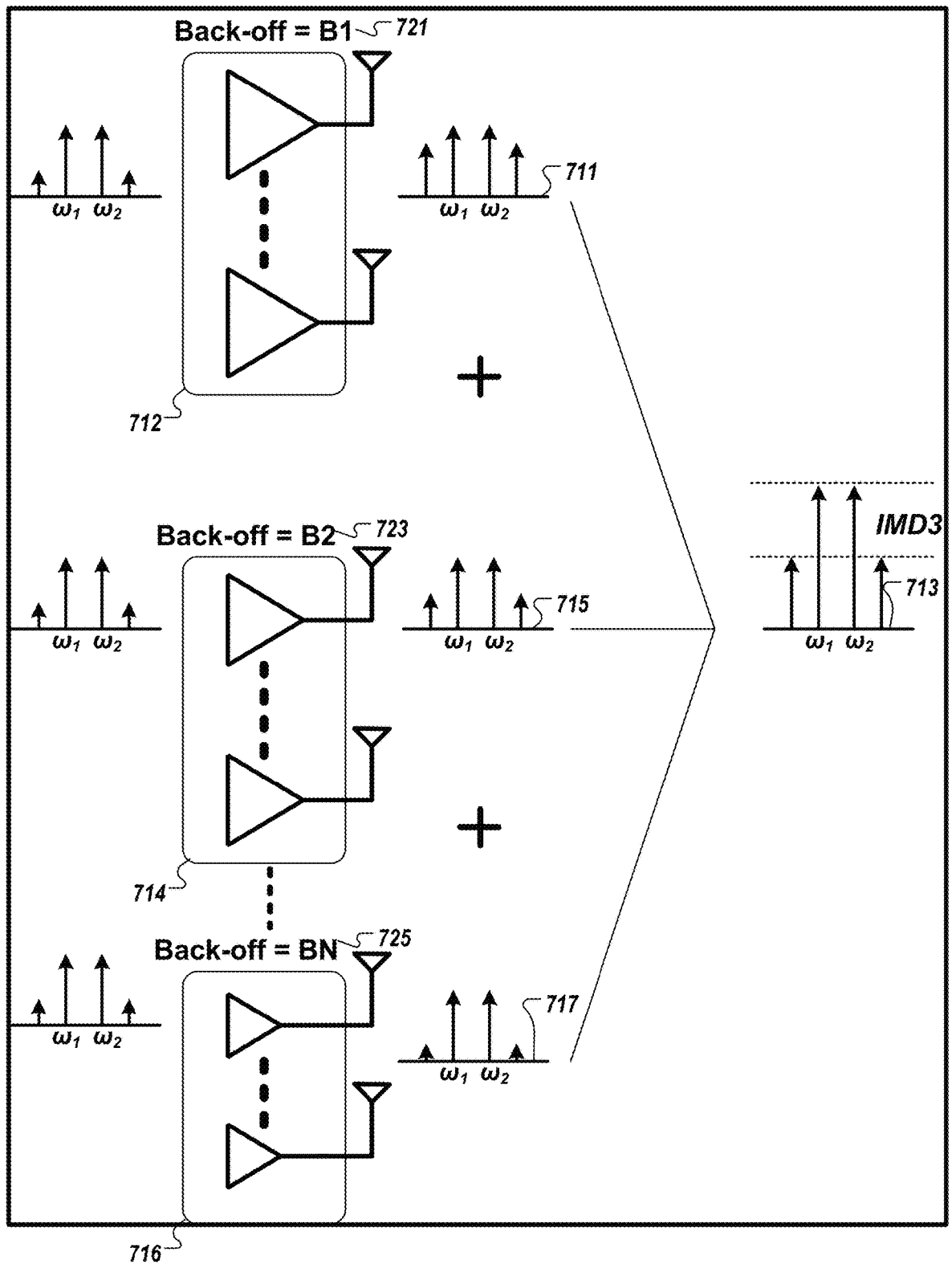
FIG. 7B is a functional diagram of a phased array antenna with N number of power amplifier bins with different power back-off parameters for the N bins, according to at least one embodiment.

FIG. 7B is a functional diagram of a phased array antenna 710 with N number of power amplifier bins with different power back-off parameters for the N bins, according to at least one embodiment. The phased array antenna 710 includes a first bin 712 with multiple power amplifiers, each coupled to an antenna element. The power amplifiers of the first bin 712 can receive a multi-tone signal at its input and outputs an amplified signal to the antenna elements, causing electromagnetic energy to be radiated by the antenna elements. The power amplifiers of the first bin 712 can have a first power back-off parameter 721 (B1). When amplifying the signal, PAs in the first bin 712 can generate IM interference components 711 that are summed with other IM interference components from other bins of power amplifiers to generate a signal with multiple harmonics 713 (as labeled IMD3). The phased array antenna 710 includes a second bin 714 with multiple power amplifiers that operate at a different power level than the first bin 712. The power amplifiers of the second bin 714 can receive the multi-tone signal at its input and outputs an amplified signal to the antenna elements, causing electromagnetic energy to be radiated by the antenna elements. The power amplifiers of the second bin 714 can have a second power back-off parameter 723 (B2) that is different than the first power back-off parameter 721 (B1). When amplifying the signal, PAs in the second bin 714 can generate IM interference components 715 that are summed with other IM interference components. The phased array antenna 710 includes an Nth bin 716 with multiple power amplifiers that operate at a different power level than the first bin 712 and second bin 714. Similarly, the power amplifiers of the Nth bin 716 can receive the multi-tone signal and cause electromagnetic energy to be radiated by the antenna elements. The power amplifiers of the third bin 716 can have a third power back-off parameter 725 (B2) that is different than the first power back-off parameter 721 and the second power back-off parameter 723. When amplifying the signal, PAs in the Nth bin 716 can generate IM interference components 717 that are summed with other IM interference components. As illustrated in FIGS. 7A-7B, optimizing the phased array antenna 710 with different back-off parameters for different bins leads to the same nonlinearity distortion at the output as the phased array antenna 700. However, the total DC power consumption now can now be optimized while maintaining the same IMD3 level leading to an optimum binning matrix [B1opt, B2opt, ... ], such as illustrated and described below with respect to FIGS. 8A-9B, which show simulated examples of this concept. Assuming Bin 1 is the bin which contains the PAs with the highest Pout, reducing back-off also implies a one to one reduction in OP1dB while maintaining the same average output power. This brings significant benefits when considering reliability and PA process technology choice. As described above, reduced max OP1dB requirement enables higher efficiency, cheaper front-end modules (FEMs) and enables use of cheaper Silicon based technologies leading to significant cost savings.

Figure 8A:
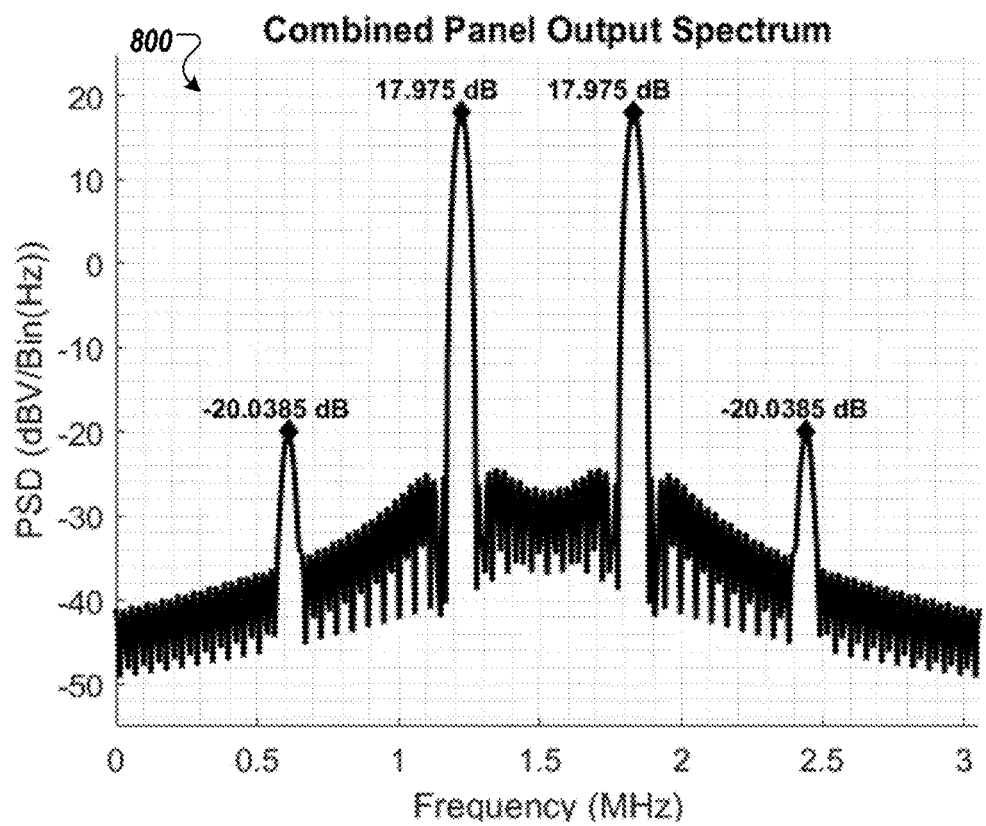
FIG. 8A is a graph of a power spectral density of a combined panel output spectrum with a same power back-off parameter for all N bins, according to at least one embodiment.

FIG. 8A is a graph 800 of a power spectral density of a combined panel output spectrum with a same power back-off parameter for all N bins, according to at least one embodiment. Graph 800 shows composite IMD3 performance of a 5024 element array with three 3 dB bins and each bin operating under equal back-off of 5.2 dB from OP1dB.

Figure 8B:
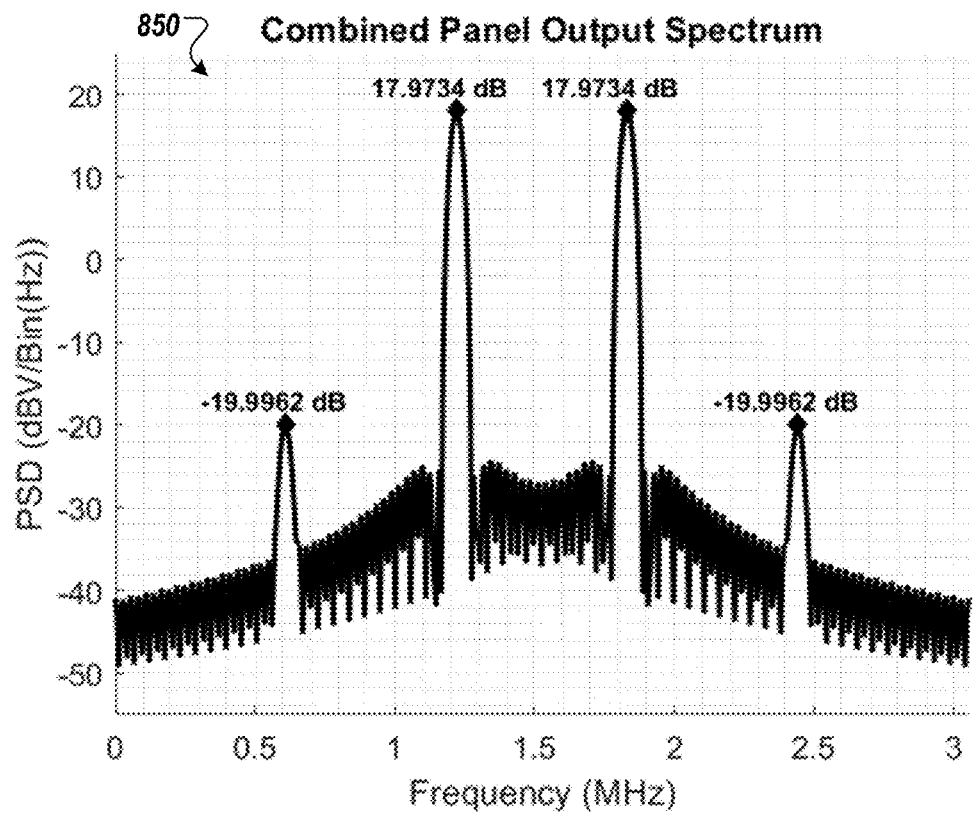
FIG. 8B is a graph of power spectral density of a combined panel output spectrum with different power back-off parameters for the N bins, according to at least one embodiment.

FIG. 8B is a graph 850 of power spectral density of a combined panel output spectrum with different power back-off parameters for the N bins, according to at least one embodiment. Graph 850 shows composite IMD3 performance of the same array with bin 1 backed-off of 4 dB from OP1dB, bin 2 backed-off of 5.7 dB from OP1dB, and bin 3 backed-off of 6.6 dB from OP1dB. Both configurations in FIGS. 8A and 8B yield the same IMD3 performance of −38 dBc and DC power consumption of 156 watts. However, the required maximum PA OP1dB of the second configuration in FIG. 8B is reduced by 1.2 dB because of the lower back-off in bin 1, which has the highest power PAs.

Figure 9A:
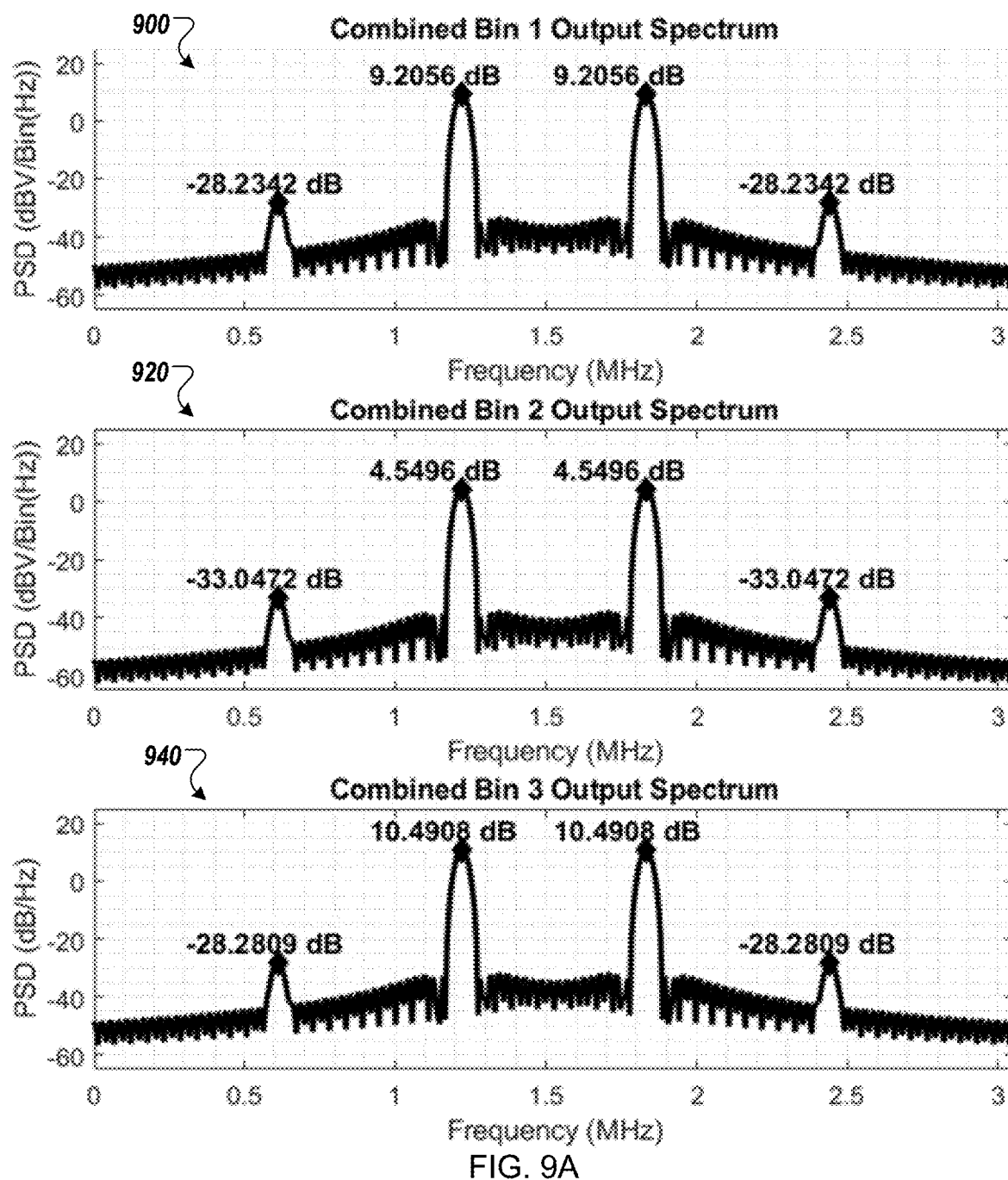
FIG. 9A illustrates graphs of power spectral densities of combined bin output spectrum of each of the three bins having a same power back-off parameter for all three bins, according to at least one embodiment.

FIG. 9A illustrates graphs 900, 920, and 940 of power spectral densities of combined bin output spectrum of each of the three bins having a same power back-off parameter for all three bins. Graph 900 shows the IMD3 performance of a first bin in a 5024 element array and the first bin is operating under equal back-off of 5.2 dB from OP1dB. Graph 920 shows the IMD3 performance of a second bin in the 5024 element array and the second bin is operating under the same back-off of 5.2 dB from OP1dB. Graph 940 shows the IMD3 performance of a third bin in the 5024 element array and the third bin is operating under the same back-off of 5.2 dB from OP1dB.

Figure 9B:
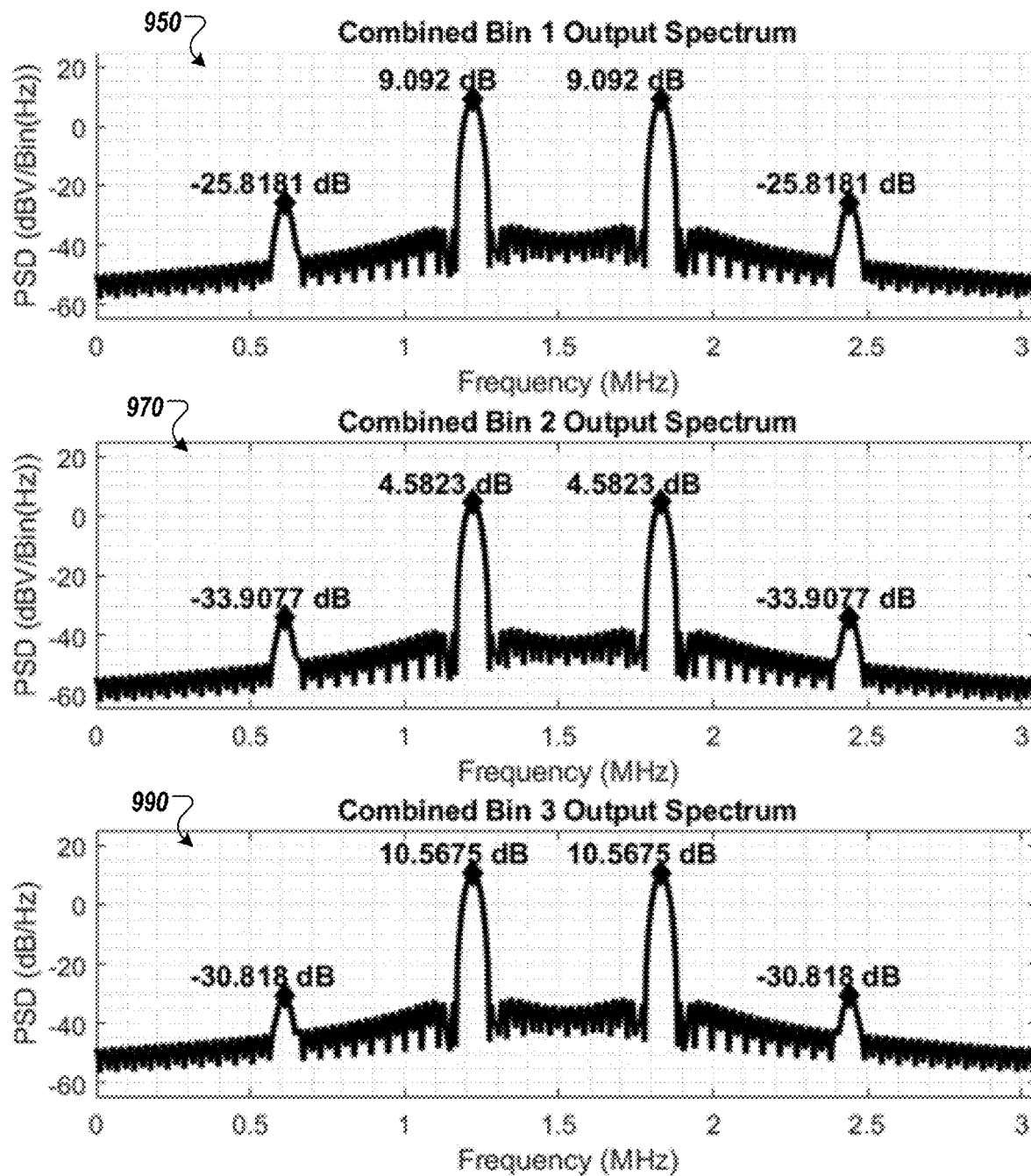
FIG. 9B illustrates graphs of power spectral densities of combined bin output spectrum of each of the three bins with a different power back-off parameter, according to at least one embodiment.

FIG. 9B illustrates graphs 950, 970, 990 of power spectral densities of combined bin output spectrum of each of the three bins with a different power back-off parameter, according to at least one embodiment. Graph 950 shows the IMD3 performance of a first bin in a 5024 element array and the first bin is backed-off 4 dB from OP1dB. Graph 970 shows the IMD3 performance of a second bin in the 5024 element array and the second bin is backed-off 5.7 dB from OP1dB. Graph 990 shows the IMD3 performance of a third bin in the 5024 element array and the third bin is backed-off 6.6 dB from OP1dB. The aggregated IMD3 performance is equivalent in both FIG. 9A and FIG. 9B for the same total EIRP.

To support a taper power distribution across the panel, it can be shown that the highest required output power (Pout) from the power amplifiers increases compared to the case with no taper (i.e. each antenna driven at the same power level). Depending on the taper profile, this higher Pout can be difficult to achieve considering a variety of factors such as reliability and process technology. power amplifier Pout limits are typically dictated by the supply voltage and supporting higher OP1dB generally leads to larger device layouts causing efficiency degradation, which leads to higher power dissipation. Additionally, large phased array systems often leverage the use of cheaper Silicon based technologies for the FEMs where achieving high OP1dB is challenging due to device reliability issues.

One drawback of an amplitude taper in a phased array is the concentration of high-power PAs in the center of the phased array panel. This arrangement of power amplifiers results in a large heat gradient across the panel as the outer edges, where the lowest power PAs are placed, can be much cooler relative to the center. Such thermal gradients affect the performance of temperature sensitive electronics, complicate the heat sink design, require involved temperature based calibration algorithms, and create unequal PCB thermal expansion causing mechanical stress and/or failure on soldered components.

By reducing the back-off of the bins containing the highest power PAs this technique allows for more efficient PA operation in these high power bins. This alleviates the thermal stress in the center of the panel by reducing the DC power consumption of each PA in the center. The thermal gradient across the panel also improves since the power of the outer bins, comprising of the lower power PAs, increases. Overall DC power of the panel remains unchanged. An example of this approach is illustrated in FIGS. 10-11.

Figure 10A:
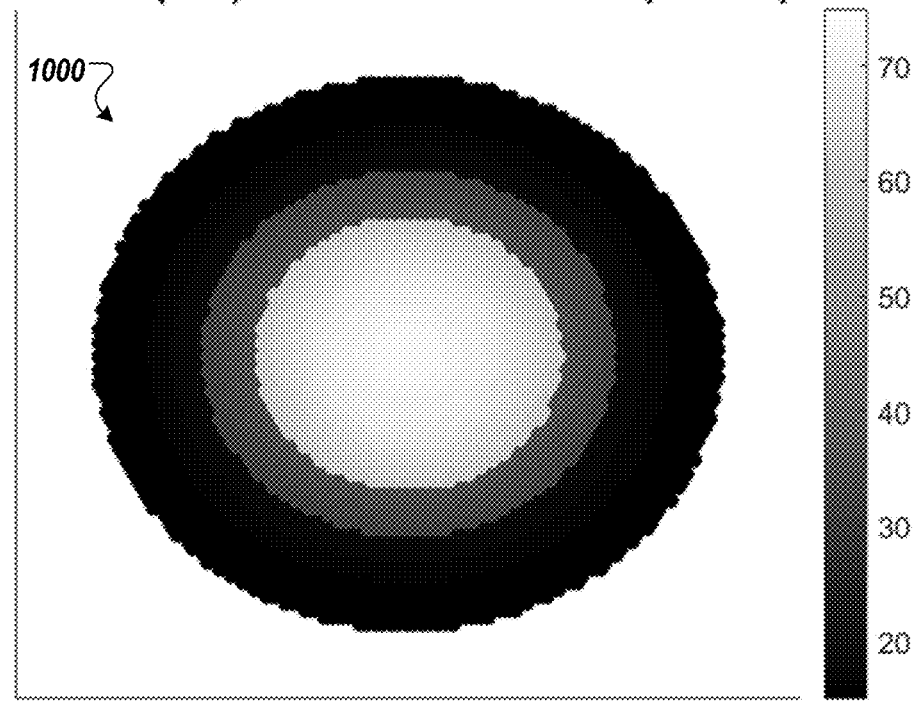
FIG. 10A is a heat map of a PA DC power consumption in a transmit phased array antenna with three bins and each bin operating under equal power back-off parameters, according to at least one embodiment.

FIG. 10A is a heat map 1000 of a PA DC power consumption in a transmit phased array antenna with three bins and each bin operating under equal power back-off parameters, according to at least one embodiment. Heat map 1000 is for a 5024 element array with three 3 dB bins and each bin operating under equal back-off of 5.2 dB from OP1dB.

Figure 10B:
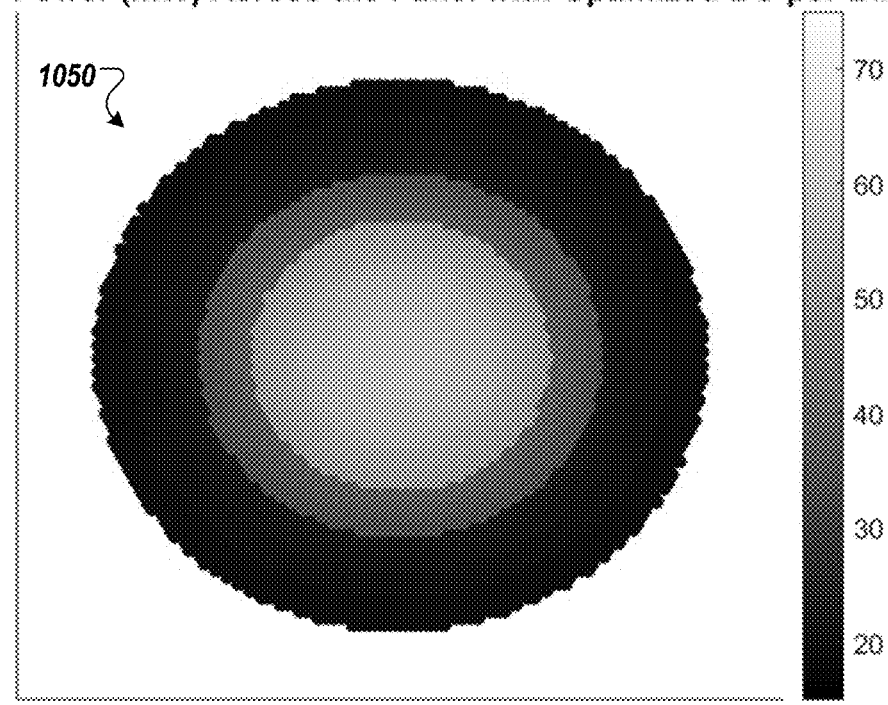
FIG. 10B is a heat map of a PA DC power consumption in a transmit phased array antenna with three bins and each bin operating under different power back-off parameters, according to at least one embodiment.

FIG. 10B is a heat map 1050 of a PA DC power consumption in a transmit phased array antenna with three bins and each bin operating under different power back-off parameters, according to at least one embodiment. Heat map 1050 is the same array except bin 1 is backed-off 4 dB from OP1dB, bin 2 is backed-off 5.7 dB from OP1dB, and bin 3 is backed-off 6.6 dB from OP1dB. As illustrated in FIGS. 10A-10B, the thermal gradient of the heat map 1050, where each bin's back-off is optimized, is less steep compared to the heat map 1000, where each bin has similar back-off.

Figure 11A:
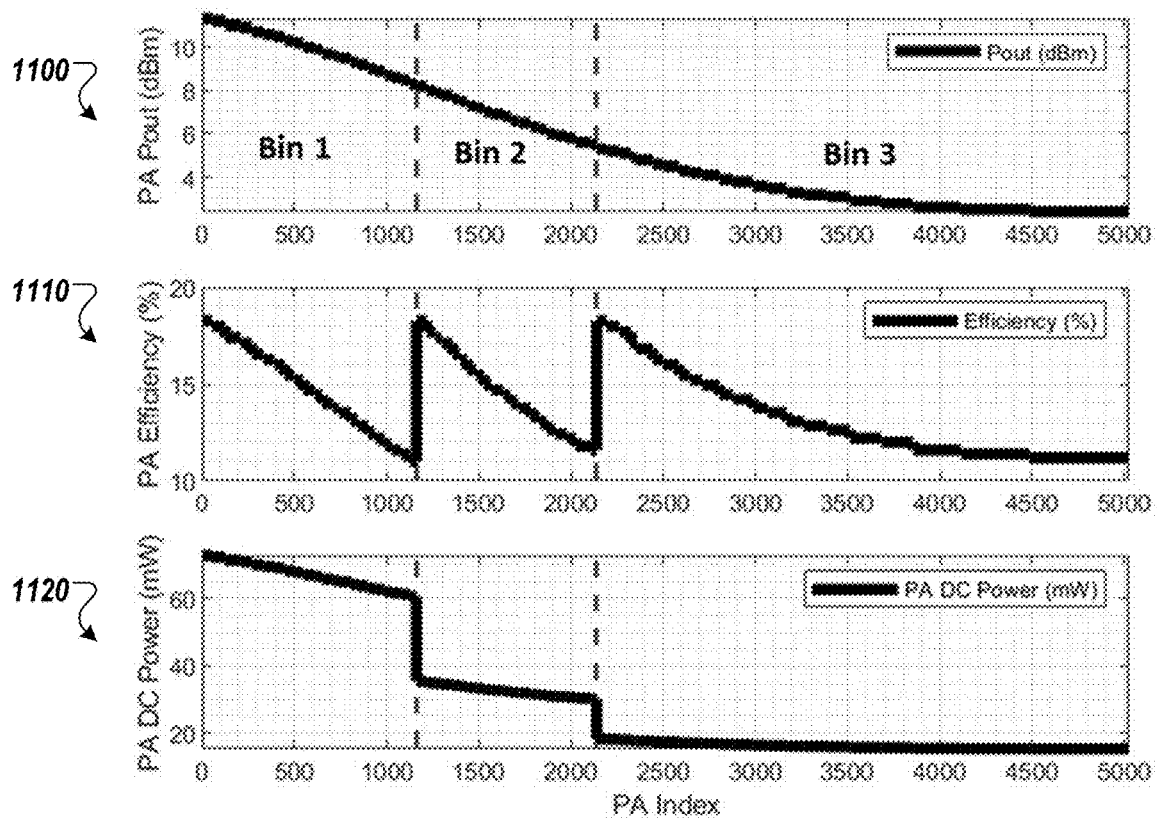
FIG. 11A are graphs of output power, average efficiency, and DC power consumption for all power amplifiers, organized with three bins and each bin operating under equal power back-off parameters, for a transmit phased array antenna, according to at least one embodiment.

FIG. 11A are graphs 1100, 1110, 1120 of output power, average efficiency, and DC power consumption for all power amplifiers, organized with three bins and each bin operating under equal power back-off parameters, for a transmit phased array antenna, according to at least one embodiment. In this embodiment, each bin is operating under the same back-off of 5.2 dB from OP1dB.

Figure 11B:
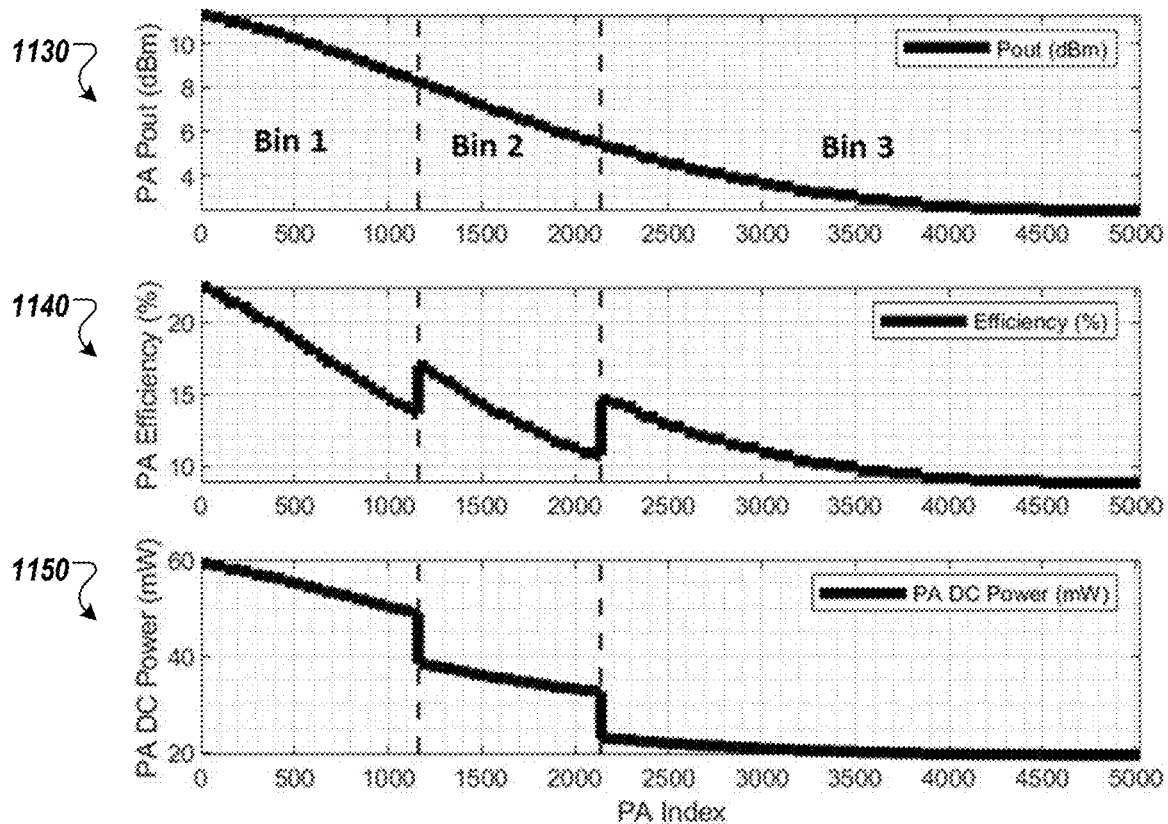
FIG. 11B are graphs of output power, average efficiency, and DC power consumption for all power amplifiers, organized with three bins and each bin operating under different power back-off parameters, for a transmit phased array antenna, according to at least one embodiment.

FIG. 11B are graphs 1130, 1140, 1150 of output power, average efficiency, and DC power consumption for all power amplifiers, organized with three bins and each bin operating under different power back-off parameters, for a transmit phased array antenna, according to at least one embodiment. In this embodiment, bin 1 is backed-off 4 dB from OP1dB, bin 2 is backed-off 5.7 dB from OP1dB, and bin 3 is backed-off 6.6 dB from OP1dB. The total panel DC power consumption in both cases is equal. However, efficiency of the high power PAs in bin 1 is drastically improved with lower back-off, as depicted in FIG. 11B, leading to less DC power and heat concentration in the center of the panel.

In one embodiment, a first subset of antenna elements is located at a center of an aperture of an array antenna and a second subset of antenna elements are located farther from the center than the first subset. The first set of power amplifiers can include a first power back-off amount from a OP1dB and the second set of power amplifiers can include a second power back-off amount from a OP1dB, the second power back-off amount being greater than the first power back-off amount. A reduction in the power level by the first power back-off amount relative to a reduction in the power level by the second power back-off amount reduces DC power consumption and heat concentration in the center. In another embodiment, the first set of power amplifiers includes a first power amplifier that operates at a lowest power level for the first set and the second set of power amplifiers includes a second power amplifier that operates at a highest power level for the second set. The second power amplifier operates at a higher energy efficiency than the first power amplifier. In another embodiment, at least a portion of the second set of power amplifiers operate at a higher energy efficiency than at least a portion of the first set of power amplifiers. As described herein, the first set of power amplifiers can be Class AB amplifiers and the second set of power amplifiers can be a different class, such as Class A, Class B, or Class C power amplifiers. Alternatively, the power amplifiers from the different sets can be the same Class, but be configured to operate at different peak power levels, as described herein. In another embodiment, a DBF device can reduce the PAPR, which can result in a lower power back-off, assuming that the PA design is changed to accommodate.

Figure 12A:
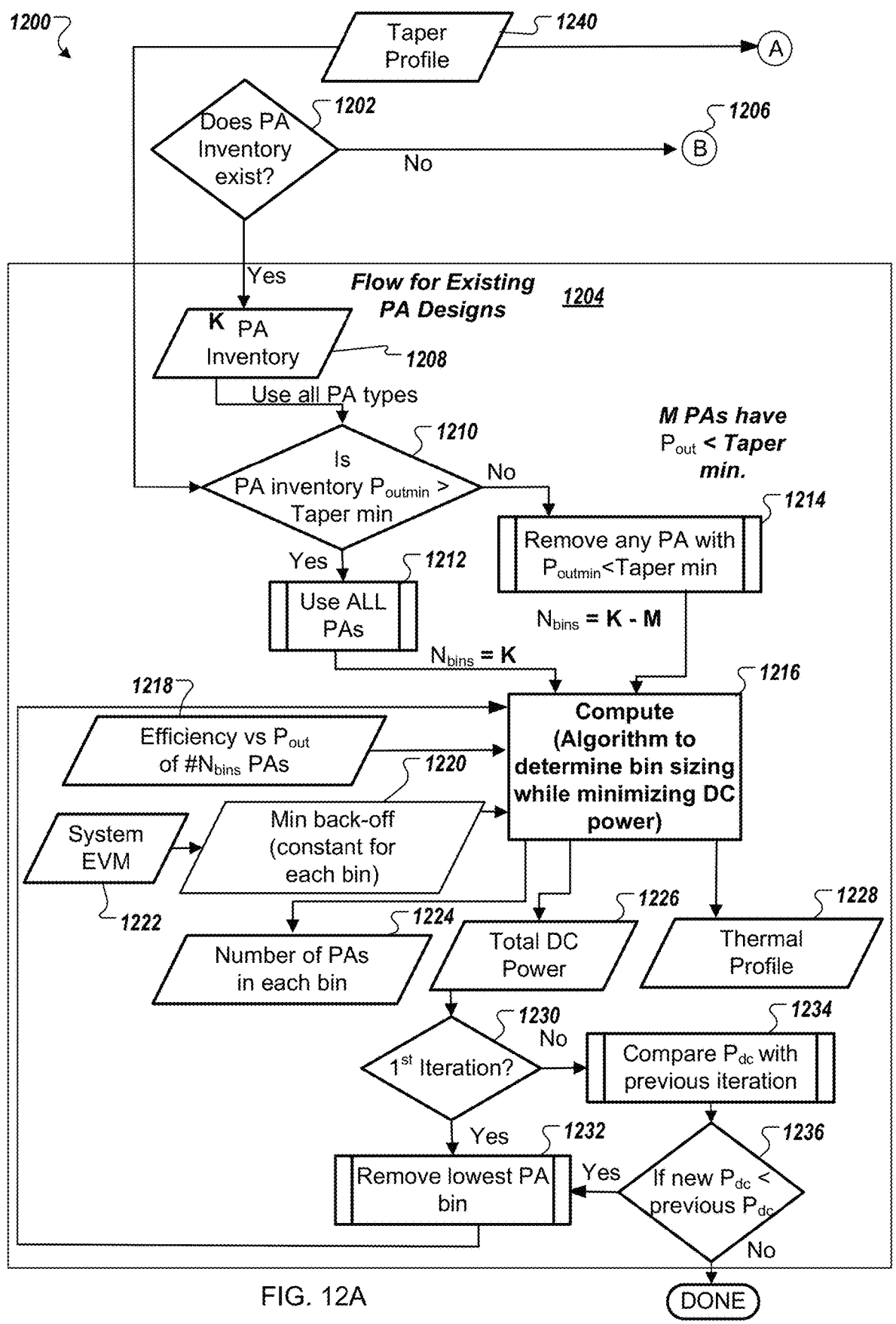
FIGS. 12A-12B is a flow diagram of a method for determining bin size while minimizing DC power consumption of a transmit phased array antenna, according to at least one embodiment.
Figure 12B:
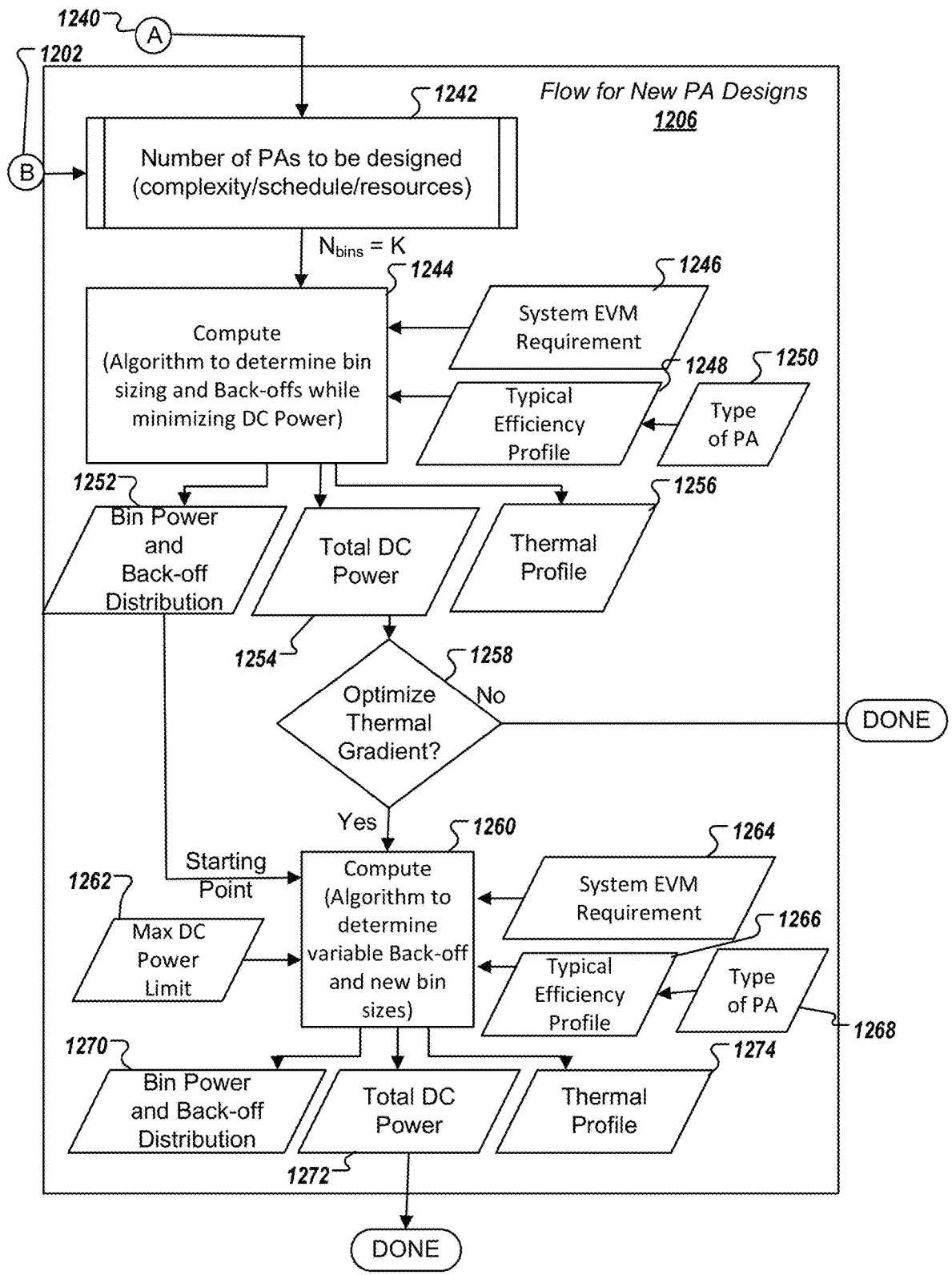

FIGS. 12A-12B is a flow diagram of a method 1200 for determining bin size while minimizing DC power consumption of a transmit phased array antenna, according to at least one embodiment. In one embodiment, method 1200 is performed by one or more processing devices of a computing system. Method 1200 can be performed by processing logic comprising hardware, software, firmware, or any combination thereof.

Referring to FIG. 12, method 1200 begins by processing logic determining whether a PA inventory exists for an existing PA design (block 1202). If processing logic determines that the PA inventory exits, the processing logic proceeds with the flow for existing PA design 1204 in FIG. 12A. If the processing logic determines that the PA inventor does not exist, the processing logic proceeds with the flow for new PA designs 1206 in FIG. 12B.

Referring back to FIG. 12A, the processing logic takes the PA inventory (K) and uses all PA types at block 1208. Processing logic determines if the PA inventory power output minimum ($P_{outmin}$) is greater than a taper minimum (block 1210). Processing logic receives a taper profile 1240 as an input to perform block 1210. If the PA inventory $P_{outmin}$ is P greater than the taper minimum, the processing logic uses all PAs in the PA inventory and sets a number of bins ($N_{bins}$) equal to K (block 1312), where K is a positive integer that is two or greater. If the PA inventory $P_{outmin}$ is not greater than the taper minimum, the processing logic removes any PA with $P_{outmin}$ that is less than the taper minimum (block 1214). An M number of PAs can be removed. The processing logic sets the number of bins ($N_{bins}$) to K less M (e.g., $N_{bins}$=K−M). At block 1216, processing logic computes a number of PAs for each of the bins while minimizing DC power. Processing logic can compute this using an algorithm. Processing logic can receive various inputs, including: an efficiency versus power out of the number of bins PAs (block 1218); and a minimum back-off for each bin (block 1220) derived from system EVM (block 1222). As a result of determining bin sizing, processing logic can output a number of PAs in each bin 1224, a total DC power consumption 1226, and a thermal profile 1228.

At block 1230, processing logic can determine if this is a first iteration. If this is the first iteration, the processing logic can remove a lowest PA bin (block 1332) and return to compute bin sizing while minimizing DC power consumption at block 1216. If this is not the first iteration, processing logic compares DC power consumption with a previous iteration (block 1234). If the new DC power consumption is less than the previous DC power consumption at block 1236, processing logic returns to block 1232, removing the lowest PA bin and returning to block 1216. If the new DC power consumption is not less than the previous DC power consumption, the processing logic ends the flow for existing PA designs 1204.

As described above, if the processing logic determines that the PA inventor does not exist, the processing logic proceeds with the flow for new PA designs 1206 in FIG. 12B.

Referring back to FIG. 12B, processing logic takes a number of PAs to be designed (complexity/schedule/resources as factors) and sets a number of bins ($N_{bins}$) equal to K (block 1242 (block 1242), where K is a positive integer that is two or greater. At block 1244, processing logic computes a number of PAs for each of the bins and back-offs while minimizing DC power. Processing logic can compute this using an algorithm. Processing logic can receive various inputs, including: system EVM requirements 1246; a typical efficiency profile 1248 derived from a type of PA being used 1250. As a result of determining bin sizing and back-offs while minimizing DC power consumption, processing logic can output Bin power and back-off distribution 1252, a total DC power consumption 1254, and a thermal profile 1256.

At block 1258, processing logic determines whether a thermal gradient is to be optimized. If the thermal gradient is not to be optimized, the processing logic can end the flow for new PA designs 1206. If the thermal gradient is to be optimized, the processing logic computes variable power back-offs and new bin sizes (block 1260). Processing logic can use a separate algorithm to determine the variable BOs and new bin sizes with various inputs, including a starting point (distribution 1252 from a first iteration of the computation), a maximum DC power limit 1262, system EVM requirements 1264, typical efficiency profile 1266 derived from a type of PA 1268. As a result of determining variable BOs and new bin sizes, processing logic can output bin power and back-off distribution 1270, a total DC power consumption 1272, and a thermal profile 1274. After outputting the bin power and back-off distribution 1270, total DC power consumption 1272, and the thermal profile 1274, processing logic ends the flow for new PA designs 1206.

Figure 13:
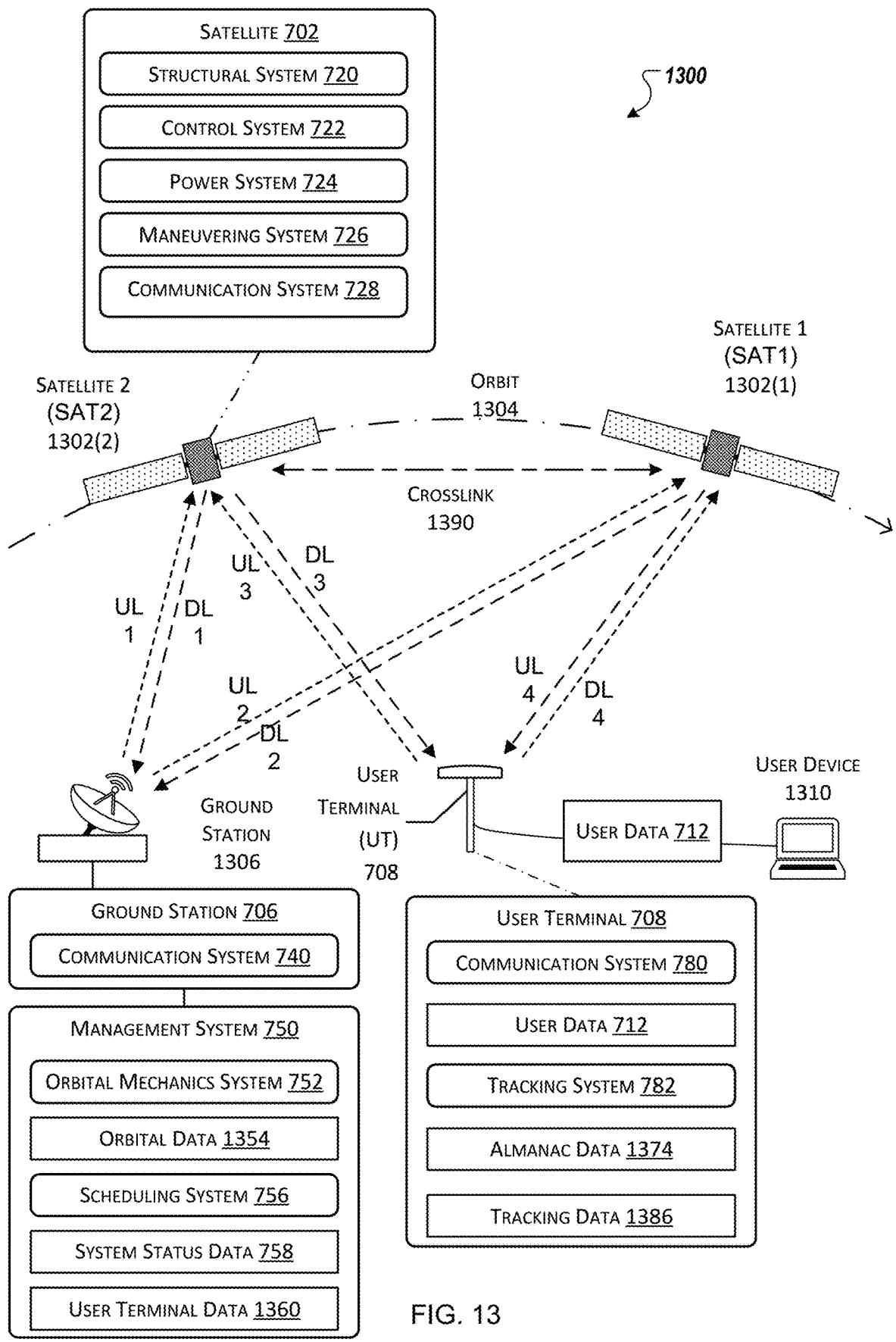
FIG. 13 illustrates a portion of a communication system that includes two satellites of a constellation of satellites, each satellite being in orbit, according to embodiments of the present disclosure.

FIG. 13 illustrates a portion of a communication system 1300 that includes two satellites of a constellation of satellites 1302(1), 1302(2), . . . , 1302(S), each satellite 1302 being in orbit 1304 according to embodiments of the present disclosure. The system 1300 shown here comprises a plurality (or "constellation") of satellites 1302(1), 1302(2), . . . , 1302(S), each satellite 1302 being in orbit 1304. Any of the satellites 1302 can include the communication system 100 or phased array antenna 400 of FIGS. 1 and 4, as well as other array antennas and Tx DBF devices described herein. Also shown is a ground station 1306, user terminal (UT) 1308, and a user device 1310.

The constellation may comprise hundreds or thousands of satellites 1302, in various orbits 1304. For example, one or more of these satellites 1302 may be in non-geosynchronous orbits (NGOs) in which they are in constant motion with respect to the Earth. For example, the orbit 1304 is a low earth orbit (LEO). In this illustration, orbit 1304 is depicted with an arc pointed to the right. A first satellite (SAT1) 1302(1) is leading (ahead of) a second satellite (SAT2) 1302(2) in the orbit 1304.

The satellite 1302 may comprise a structural system 1320, a control system 1322, a power system 1324, a maneuvering system 1326, and a communication system 1328 described herein. In other implementations, some systems may be omitted or other systems added. One or more of these systems may be communicatively coupled with one another in various combinations.

The structural system 1320 comprises one or more structural elements to support operation of the satellite 1302. For example, the structural system 1320 may include trusses, struts, panels, and so forth. The components of other systems may be affixed to, or housed by, the structural system 1320. For example, the structural system 1320 may provide mechanical mounting and support for solar panels in the power system 1324. The structural system 1320 may also provide for thermal control to maintain components of the satellite 1302 within operational temperature ranges. For example, the structural system 1320 may include louvers, heat sinks, radiators, and so forth.

The control system 1322 provides various services, such as operating the onboard systems, resource management, providing telemetry, processing commands, and so forth. For example, the control system 1322 may direct operation of the communication system 1328.

The power system 1324 provides electrical power for operation of the components onboard the satellite 1302. The power system 1324 may include components to generate electrical energy. For example, the power system 1324 may comprise one or more photovoltaic cells, thermoelectric devices, fuel cells, and so forth. The power system 1324 may include components to store electrical energy. For example, the power system 1324 may comprise one or more batteries, fuel cells, and so forth.

The maneuvering system 1326 maintains the satellite 1302 in one or more of a specified orientation or orbit 1304. For example, the maneuvering system 1326 may stabilize the satellite 1302 with respect to one or more axis. In another example, the maneuvering system 1326 may move the satellite 1302 to a specified orbit 1304. The maneuvering system 1326 may include one or more computing devices, sensors, thrusters, momentum wheels, solar sails, drag devices, and so forth. For example, the sensors of the maneuvering system 1326 may include one or more global navigation satellite system (GNSS) receivers, such as global positioning system (GPS) receivers, to provide information about the position and orientation of the satellite 1302 relative to Earth. In another example, the sensors of the maneuvering system 1326 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 1328 provides communication with one or more other devices, such as other satellites 1302, ground stations 1306, user terminals 1308, and so forth. The communication system 1328 may include one or more modems, digital signal processors, power amplifiers, antennas (including at least one antenna that implements multiple antenna elements, such as a phased array antenna, and including an embedded calibration antenna, such as the calibration antenna 1304 as described herein), processors, memories, storage devices, communications peripherals, interface buses, and so forth. Such components support communications with other satellites 1302, ground stations 1306, user terminals 1308, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1328 may be output to other systems, such as to the control system 1322, for further processing. Output from a system, such as the control system 1322, may be provided to the communication system 1328 for transmission.

One or more ground stations 1306 are in communication with one or more satellites 1302. The ground stations 1306 may pass data between the satellites 1302, a management system 1350, networks such as the Internet, and so forth. The ground stations 1306 may be emplaced on land, on vehicles, at sea, and so forth. Each ground station 1306 may comprise a communication system 1340. Each ground station 1306 may use the communication system 1340 to establish communication with one or more satellites 1302, other ground stations 1306, and so forth. The ground station 1306 may also be connected to one or more communication networks. For example, the ground station 1306 may connect to a terrestrial fiber optic communication network. The ground station 1306 may act as a network gateway, passing user data 1312 or other data between the one or more communication networks and the satellites 1302. Such data may be processed by the ground station 1306 and communicated via the communication system 1340. The communication system 1340 of a ground station may include components similar to those of the communication system 1328 of a satellite 1302 and may perform similar communication functionalities. For example, the communication system 1340 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1306 are in communication with a management system 1350. The management system 1350 is also in communication, via the ground stations 1306, with the satellites 1302 and the UTs 1308. The management system 1350 coordinates operation of the satellites 1302, ground stations 1306, UTs 1308, and other resources of the system 1300. The management system 1350 may comprise one or more of an orbital mechanics system 1352 or a scheduling system 1356. In some embodiments, the scheduling system 1356 can operate in conjunction with an HD controller.

The orbital mechanics system 1352 determines orbital data 1354 that is indicative of a state of a particular satellite 1302 at a specified time. In one implementation, the orbital mechanics system 1352 may use orbital elements that represent characteristics of the orbit 1304 of the satellites 1302 in the constellation to determine the orbital data 1354 that predicts location, velocity, and so forth of particular satellites 1302 at particular times or time intervals. For example, the orbital mechanics system 1352 may use data obtained from actual observations from tracking stations, data from the satellites 1302, scheduled maneuvers, and so forth to determine the orbital elements. The orbital mechanics system 1352 may also consider other data, such as space weather, collision mitigation, orbital elements of known debris, and so forth.

The scheduling system 1356 schedules resources to provide communication to the UTs 1308. For example, the scheduling system 1356 may determine handover data that indicates when communication is to be transferred from the first satellite 1302(1) to the second satellite 1302(2). Continuing the example, the scheduling system 1356 may also specify communication parameters such as frequency, timeslot, and so forth. During operation, the scheduling system 1356 may use information such as the orbital data 1354, system status data 1358, user terminal data 1360, and so forth.

The system status data 1358 may comprise information such as which UTs 1308 are currently transferring data, satellite availability, current satellites 1302 in use by respective UTs 1308, capacity available at particular ground stations 1306, and so forth. For example, the satellite availability may comprise information indicative of satellites 1302 that are available to provide communication service or those satellites 1302 that are unavailable for communication service. Continuing the example, a satellite 1302 may be unavailable due to malfunction, previous tasking, maneuvering, and so forth. The system status data 1358 may be indicative of past status, predictions of future status, and so forth. For example, the system status data 1358 may include information such as projected data traffic for a specified interval of time based on previous transfers of user data 1312. In another example, the system status data 1358 may be indicative of future status, such as a satellite 1302 being unavailable to provide communication service due to scheduled maneuvering, scheduled maintenance, scheduled decommissioning, and so forth.

The user terminal data 1360 may comprise information such a location of a particular UT 1308. The user terminal data 1360 may also include other information such as a priority assigned to user data 1312 associated with that UT 1308, information about the communication capabilities of that particular UT 1308, and so forth. For example, a particular UT 1308 in use by a business may be assigned a higher priority relative to a UT 1308 operated in a residential setting. Over time, different versions of UTs 1308 may be deployed, having different communication capabilities such as being able to operate at particular frequencies, supporting different signal encoding schemes, having different antenna configurations, and so forth.

The UT 1308 includes a communication system 1380 to establish communication with one or more satellites 1302. The communication system 1380 of the UT 1308 may include components similar to those of the communication system 1328 of a satellite 1302 and may perform similar communication functionalities. For example, the communication system 1380 may include one or more modems, digital signal processors, power amplifiers, antennas (including at least one antenna that implements multiple antenna elements, such as a phased array antenna), processors, memories, storage devices, communications peripherals, interface buses, and so forth. The UT 1308 passes user data 1312 between the constellation of satellites 1302 and the user device 1310. The user data 1312 includes data originated by the user device 1310 or addressed to the user device 1310. The UT 1308 may be fixed or in motion. For example, the UT 1308 may be used at a residence, or on a vehicle such as a car, boat, aerostat, drone, airplane, and so forth.

The UT 1308 includes a tracking system 1382. The tracking system 1382 uses almanac data 1384 to determine tracking data 1386. The almanac data 1384 provides information indicative of orbital elements of the orbit 1304 of one or more satellites 1302. For example, the almanac data 1384 may comprise orbital elements such as "two-line element" data for the satellites 1302 in the constellation that are broadcast or otherwise sent to the UTs 1308 using the communication system 1380.

The tracking system 1382 may use the current location of the UT 1308 and the almanac data 1384 to determine the tracking data 1386 for the satellite 1302. For example, based on the current location of the UT 1308 and the predicted position and movement of the satellites 1302, the tracking system 1382 is able to calculate the tracking data 1386. The tracking data 1386 may include information indicative of azimuth, elevation, distance to the second satellite, time of flight correction, or other information at a specified time.

The determination of the tracking data 1386 may be ongoing. For example, the first UT 1308 may determine tracking data 1386 every 1300 ms, every second, every five seconds, or at other intervals.

With regard to FIG. 13, an uplink is a communication link which allows data to be sent to a satellite 1302 from a ground station 1306, UT 1308, or device other than another satellite 1302. Uplinks are designated as UL1, UL2, UL3 and so forth. For example, UL1 is a first uplink from the ground station 1306 to the second satellite 1302(2). In comparison, a downlink is a communication link which allows data to be sent from the satellite 1302 to a ground station 1306, UT 1308, or device other than another satellite 1302. For example, DL1 is a first downlink from the second satellite 1302(2) to the ground station 1306. The satellites 1302 may also be in communication with one another. For example, a crosslink 1390 provides for communication between satellites 1302 in the constellation.

The satellite 1302, the ground station 1306, the user terminal 1308, the user device 1310, the management system 1350, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 14:
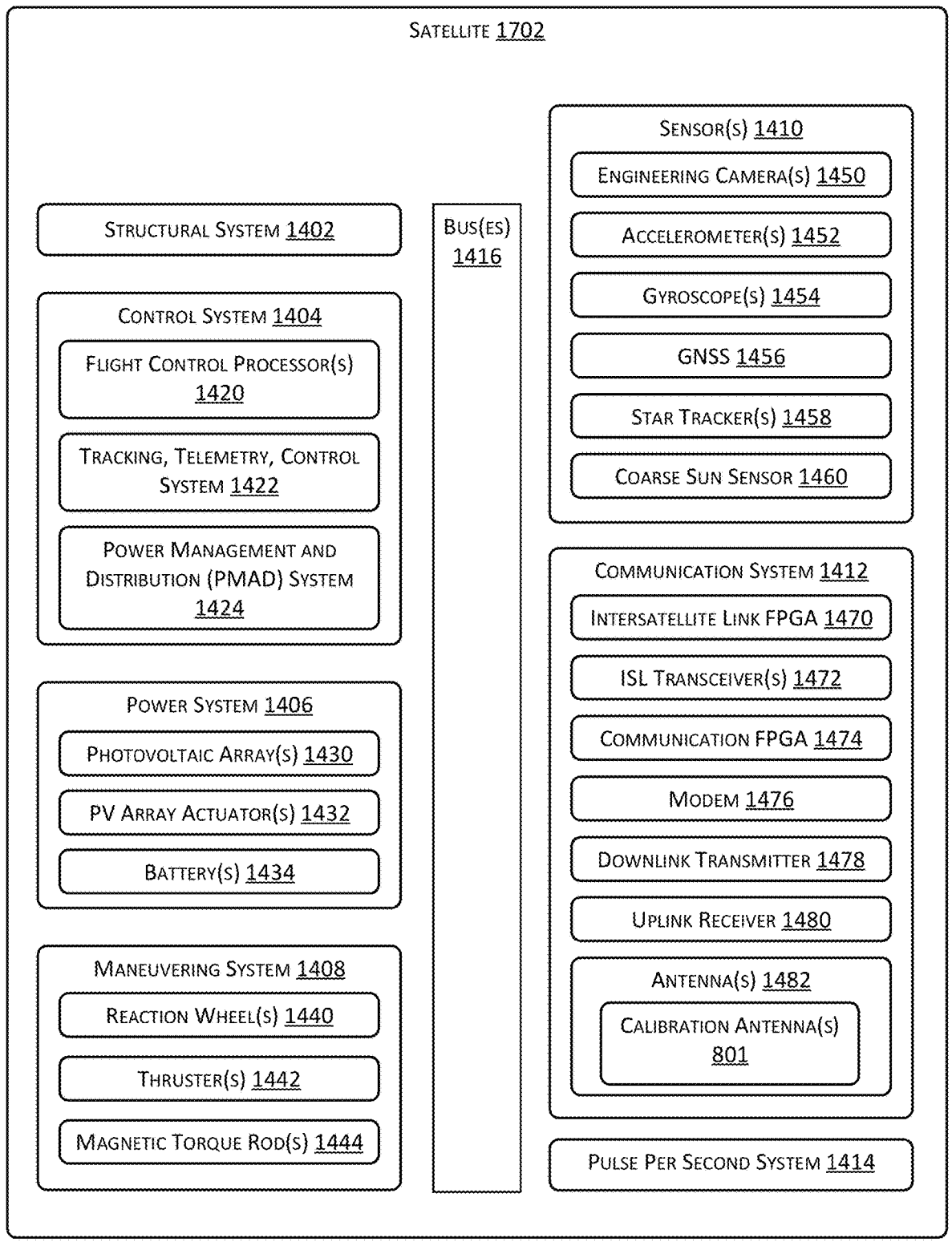
FIG. 14 is a functional block diagram of some systems associated with the satellite, according to some implementations.

FIG. 14 is a functional block diagram of some systems associated with the satellite 1302, according to some implementations. The satellite 1302 may comprise a structural system 1402, a control system 1404, a power system 1406, a maneuvering system 1408, one or more sensors 1410, and a communication system 1412. A pulse per second (PPS) system 1414 may be used to provide timing reference to the systems onboard the satellite 1302. One or more busses 1416 may be used to transfer data between the systems onboard the satellite 1302. In some implementations, redundant busses 1416 may be provided. The busses 1416 may include, but are not limited to, data busses such as Controller Area Network Flexible Data Rate (CAN FD), Ethernet, Serial Peripheral Interface (SPI), and so forth. In some implementations the busses 1416 may carry other signals. For example, a radio frequency bus may comprise coaxial cable, waveguides, and so forth to transfer radio signals from one part of the satellite 1302 to another. In other implementations, some systems may be omitted or other systems added. One or more of these systems may be communicatively coupled with one another in various combinations.

The structural system 1402 comprises one or more structural elements to support operation of the satellite 1302. For example, the structural system 1402 may include trusses, struts, panels, and so forth. The components of other systems may be affixed to, or housed by, the structural system 1402. For example, the structural system 1402 may provide mechanical mounting and support for solar panels in the power system 1406. The structural system 1402 may also provide for thermal control to maintain components of the satellite 1302 within operational temperature ranges. For example, the structural system 1402 may include louvers, heat sinks, radiators, and so forth.

The control system 1404 provides various services, such as operating the onboard systems, resource management, providing telemetry, processing commands, and so forth. For example, the control system 1404 may direct operation of the communication system 1412. The control system 1404 may include one or more flight control processors 1420. The flight control processors 1420 may comprise one or more processors, FPGAs, and so forth. A tracking, telemetry, and control (TTC) system 1422 may include one or more processors, radios, and so forth. For example, the TTC system 1422 may comprise a dedicated radio transmitter and receiver to receive commands from a ground station 1306, send telemetry to the ground station 1306, and so forth. A power management and distribution (PMAD) system 1424 may direct operation of the power system 1406, control distribution of power to the systems of the satellite 1302, control battery 1434 charging, and so forth.

The power system 1406 provides electrical power for operation of the components onboard the satellite 1302. The power system 1406 may include components to generate electrical energy. For example, the power system 1406 may comprise one or more photovoltaic arrays 1430 comprising a plurality of photovoltaic cells, thermoelectric devices, fuel cells, and so forth. One or more PV array actuators 1432 may be used to change the orientation of the photovoltaic array(s) 1430 relative to the satellite 1302. For example, the PV array actuator 1432 may comprise a motor. The power system 1406 may include components to store electrical energy. For example, the power system 1406 may comprise one or more batteries 1434, fuel cells, and so forth.

The maneuvering system 1408 maintains the satellite 1302 in one or more of a specified orientation or orbit 1304. For example, the maneuvering system 1408 may stabilize the satellite 1302 with respect to one or more axes. In another example, the maneuvering system 1408 may move the satellite 1302 to a specified orbit 1304. The maneuvering system 1408 may include one or more reaction wheel(s) 1440, thrusters 1442, magnetic torque rods 1444, solar sails, drag devices, and so forth. The thrusters 1442 may include, but are not limited to, cold gas thrusters, hypergolic thrusters, solid-fuel thrusters, ion thrusters, arcj et thrusters, electrothermal thrusters, and so forth. During operation, the thrusters may expend propellant. For example, an electrothermal thruster may use water as propellant, using electrical power obtained from the power system 1406 to expel the water and produce thrust. During operation, the maneuvering system 1408 may use data obtained from one or more of the sensors 1410.

The satellite 1302 includes one or more sensors 1410. The sensors 1410 may include one or more engineering cameras 1450. For example, an engineering camera 1450 may be mounted on the satellite 1302 to provide images of at least a portion of the photovoltaic array 1430. Accelerometers 1452 provide information about acceleration of the satellite 1302 along one or more axes. Gyroscopes 1454 provide information about rotation of the satellite 1302 with respect to one or more axes. The sensors 1410 may include a global navigation satellite system (GNSS) 1456 receiver, such as Global Positioning System (GPS) receiver, to provide information about the position of the satellite 1302 relative to Earth. In some implementations the GNSS 1456 may also provide information indicative of velocity, orientation, and so forth. One or more star trackers 1458 may be used to determine an orientation of the satellite 1302. A coarse sun sensor 1460 may be used to detect the sun, provide information on the relative position of the sun with respect to the satellite 1302, and so forth. The satellite 1302 may include other sensors 1410 as well. For example, the satellite 1302 may include a horizon detector, radar, lidar, and so forth.

The communication system 1412 provides communication with one or more other devices, such as other satellites 1302, ground stations 1306, user terminals 1308, and so forth. The communication system 1412 may include one or more modems 1476, digital signal processors, power amplifiers, antennas 1482 (including at least one antenna that implements multiple antenna elements, such as a phased array antenna such as the antenna elements 102 of FIG. 1), processors, memories, storage devices, communications peripherals, interface buses, and so forth. Such components support communications with other satellites 1302, ground stations 1306 user terminals 1308, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1412 may be output to other systems, such as to the control system 1404, for further processing. Output from a system, such as the control system 1404, may be provided to the communication system 1412 for transmission.

The communication system 1412 may include hardware to support the intersatellite link 1390. For example, an intersatellite link FPGA 1470 may be used to modulate data that is sent and received by an ISL transceiver 1472 to send data between satellites 1302. The ISL transceiver 1472 may operate using radio frequencies, optical frequencies, and so forth.

A communication FPGA 1474 may be used to facilitate communication between the satellite 1302 and the ground stations 1306, UTs 1308, and so forth. For example, the communication FPGA 1474 may direct operation of a modem 1476 to modulate signals sent using a downlink transmitter 1478 and demodulate signals received using an uplink receiver 1480. The satellite 1302 may include one or more antennas 1482. For example, one or more parabolic antennas may be used to provide communication between the satellite 1302 and one or more ground stations 1306. In another example, a phased array antenna may be used to provide communication between the satellite 1302 and the UTs 1308.

Figure 15:
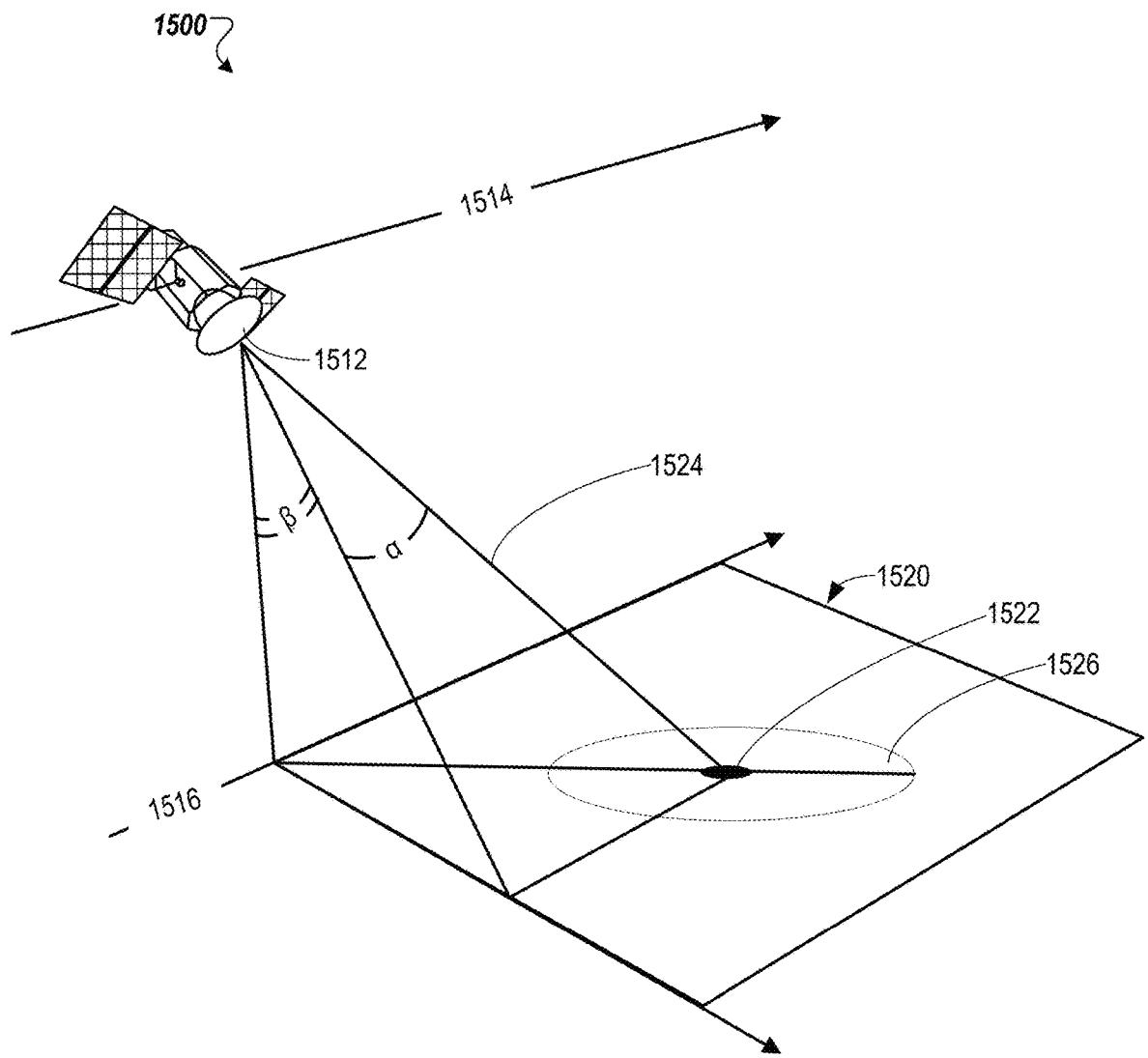
FIG. 15 illustrates a satellite including an antenna system that is steerable, according to embodiments of the present disclosure.

FIG. 15 illustrates the satellite 1500 including an antenna system 1512 that is steerable according to embodiments of the present disclosure. The satellite 1500 can include can include the communication system 100 or phased array antenna 400 of FIGS. 1 and 4, as well as other array antennas and Tx DBF devices described herein. The antenna system 1512 may include multiple antenna elements that form an antenna and that can be mechanically or electrically steered individually, collectively, or a combination thereof. In an example, the antenna is a phased array antenna.

In orbit 1304, the satellite 1500 follows a path 1514, the projection of which onto the surface of the Earth forms a ground path 1516. In the example illustrated in FIG. 15, the ground path 1516 and a projected axis extending orthogonally from the ground path 1516 at the position of the satellite 1500, together define a region 1520 of the surface of the Earth. In this example, the satellite 1500 is capable of establishing uplink and downlink communications with one or more of ground stations, user terminals, or other devices within the region 1520. In some embodiments, the region 1520 may be located in a different relative position to the ground path 1516 and the position of the satellite 1500. For example, the region 1520 may describe a region of the surface of the Earth directly below the satellite 1500. Furthermore, embodiments may include communications between the satellite 1500, an airborne communications system, and so forth.

As shown in FIG. 15, a communication target 1522 (e.g., a ground station, a user terminal, or a CT (such as an HD CT)) is located within the region 1520. The satellite 1500 controls the antenna system 1512 to steer transmission and reception of communications signals to selectively communicate with the communication target 1522. For example, in a downlink transmission from the satellite 1500 to the communication target 1522, a signal beam 1524 emitted by the antenna system 1512 is steerable within an area 1526 of the region 1520. In some implementations, the signal beam 1524 may include multiple subbeams. The extents of the area 1526 define an angular range within which the signal beam 1524 is steerable, where the direction of the signal beam 1524 is described by a beam angle "α" relative to a surface normal vector of the antenna system 1512. In two-dimensional phased array antennas, the signal beam 1524 is steerable in two dimensions, described in FIG. 15 by a second angle "β" orthogonal to the beam angle α. In this way, the area 1526 is a two-dimensional area within the region 1520, rather than a linear track at a fixed angle determined by the orientation of the antenna system 1512 relative to the ground path 1516.

In FIG. 15, as the satellite 1500 follows the path 1514, the area 1526 tracks along the surface of the Earth. In this way, the communication target 1522, which is shown centered in the area 1526 for clarity, is within the angular range of the antenna system 1512 for a period of time. During that time, signals communicated between the satellite 1500 and the communication target 1522 are subject to bandwidth constraints, including but not limited to signal strength and calibration of the signal beam 1524. In an example, for phased array antenna systems, the signal beam 1524 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 16:
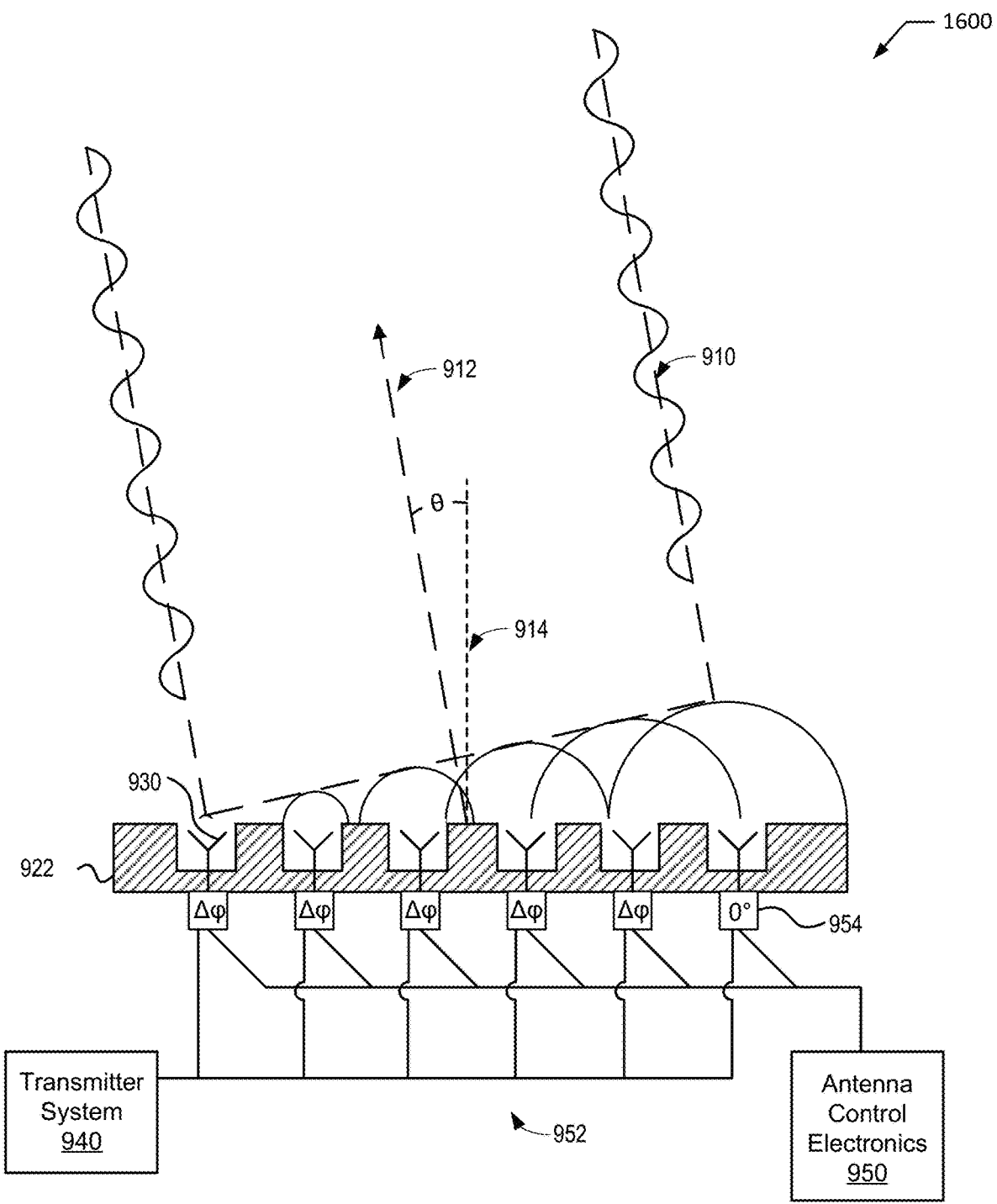
FIG. 16 illustrates a simplified schematic of an antenna, according to embodiments of the present disclosure.

FIG. 16 illustrates a simplified schematic of an antenna 1600, according to embodiments of the present disclosure. The antenna 1600 may be a component of the antenna system 1512 of FIG. 15. As illustrated, the antenna 1600 is a phased array antenna that includes multiple antenna elements 1630 (e.g. antenna elements 102 in FIG. 1). Interference between the antenna elements 1630 forms a directional radiation pattern in both transmitter and receiver arrays forming a beam 1610 (beam extents shown as dashed lines). The beam 1610 is a portion of a larger transmission pattern (not shown) that extends beyond the immediate vicinity of the antenna 1600. The beam 1610 is directed along a beam vector 1612, described by an angle "θ" relative to an axis 1614 normal to a surface of the antenna 1600. As described below, the beam 1610 is one or more of steerable or shapeable through control of operating parameters including, but not limited to a phase and an amplitude of each antenna element 1630.

In FIG. 16, the antenna 1600 includes, within a transmitter section 1622, the antenna elements 1630, which may include, but are not limited to, omnidirectional transmitter antennas coupled to a transmitter system 1640, such as the downlink transmitter 1478. The transmitter system 1640 provides a signal, such as a downlink signal to be transmitted to a ground station on the surface. The downlink signal is provided to each antenna element 1630 as a time-varying signal that may include several multiplexed signals. To steer the beam 1610 relative to the axis 1614, the phased array antenna system 1600 includes antenna control electronics 1650 controlling a radio frequency (RF) feeding network 1652, including multiple signal conditioning components 1654 interposed between the antenna elements 1630 and the transmitter system 1640. The signal conditioning components 1654 introduce one or more of a phase modulation or an amplitude modulation (e.g. by phase shifters 116 in FIG. 1), as denoted by "Ay" in FIG. 16, to the signal sent to the antenna elements 1630. As shown in FIG. 16, introducing a progressive phase modulation produces interference in the individual transmission of each antenna element 1630 that generates the beam 1610.

The phase modulation imposed on each antenna element 1630 can differ and can be dependent on a spatial location of a communication target that determines an optimum beam vector (e.g., where the beam vector 1612 is found by one or more of maximizing signal intensity or connection strength). The optimum beam vector may change with time as the communication target 1522 moves relative to the phased array antenna system 1600.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
   an array antenna comprising a plurality of antenna elements;
   a first set of power amplifiers, each coupled to one of a first subset of the plurality of antenna elements, wherein the first set of power amplifiers comprises a first peak power level;
   a second set of power amplifiers, each coupled to one of a second subset of the plurality of antenna elements, wherein the second set of power amplifiers comprises a second peak power level that is lower than the first peak power level;
   a digital beamforming (DBF) device coupled to the first set of power amplifiers and the second set of power amplifiers, wherein the DBF device comprises digital phase shifters and is configured to:
      generate, using the digital phase shifters, a first set of signals and a second set of signals;
      send the first set of signals to the first set of power amplifiers causing the first set of power amplifiers to operate in a first range; and
      send the second set of signals to the second set of power amplifiers causing the second set of power amplifiers to operate in a second range.

2. The communication system of claim 1, wherein:
   the first set of power amplifiers comprises a power back-off parameter that is set to a first power level; and
   the second set of power amplifiers comprises a power back-off parameter that is set to a second power level.

3. The communication system of claim 1, further comprising:
   a third set of power amplifiers, each coupled to a third subset of the plurality of antenna elements, wherein the third set of power amplifiers comprises a third peak power level that is lower than the second peak power level.

4. The communication system of claim 1, wherein power amplifiers of the first set of power amplifiers are a first type of power amplifier, and wherein power amplifiers of the second set of power amplifiers are a second type of power amplifier.

5. The communication system of claim 1, wherein:
   the first subset of the plurality of antenna elements are located at a center of an aperture of the array antenna and the second subset of the plurality of antenna elements are located farther from the center than the first subset of the plurality of antenna elements;
   the first set of power amplifiers are set to have a first power back-off amount from a 1-dB compression point (OP1dB); and
   the second set of power amplifiers are set to have a second power back-off amount from an OP1dB, the second power back-off amount being greater than the first power back-off amount.

6. The communication system of claim 1, wherein the first set of power amplifiers comprises a first power amplifier that operates at a lowest power level for the first set, wherein the second set of power amplifiers comprises a second power amplifier that operates at a highest power level for the second set, wherein the second power amplifier operates at a higher energy efficiency than the first power amplifier.

7. The communication system of claim 1, wherein at least a portion of the second set of power amplifiers operate at a higher energy efficiency than at least a portion of the first set of power amplifiers.

8. The communication system of claim 1, wherein the first set of power amplifiers comprises Class AB amplifiers.

9. A satellite comprising:
   a structural system;
   a maneuvering system; and a communication system, wherein the communication system comprises
a phased array antenna;
a plurality of power amplifiers (PAs), wherein the plurality of PAs include at least a first group of PAs of a first type and a second group of PAs of a second type;
a digital beamforming (DBF) device coupled to the plurality of PAs, wherein the DBF device comprises digital phase shifters and is configured to:
generate, using the digital phase shifters, a first set of signals and a second set of signals;
send the first set of signals to the first group of PAs causing the first group of PAs to operate in a first range; and
send the second set of signals to the second group of PAs causing the second group of PAs to operate in a second range that is different than the first range.

10. The satellite of claim 9, wherein:
the first group comprises a power back-off parameter that is set to a first power level; and
the second group comprises a power back-off parameter that is set to a second power level.

11. The satellite of claim 10, wherein the first power level and the second power level are different power levels.

12. The satellite of claim 9, wherein power amplifiers of the first group of PAs comprise a first peak power level, and wherein power amplifiers of the second group of PAs comprise a second peak power level that is less than the first peak power level.

13. The satellite of claim 9, wherein:
a first set of antenna elements of the phased array antenna are located at a center of an aperture of the phased array antenna and a second set of antenna elements of the phased array antenna are located farther from the center than the first set of antenna elements, each of the first set being coupled to one power amplifier of the first group of PAs and each of the second set being coupled to one power amplifier of the second group of PAs;
the first group of PAs are set to have a first power back-off amount from a 1-dB compression point (OP1dB); and
the second group of PAs are set to have a second power back-off amount from an OP1dB, the second power back-off amount being greater than the first power back-off amount.

14. The satellite of claim 13, wherein the plurality of PAs further include a third group of PAs of a third type, wherein the DBF device is further configured to send a third set of signals to the third group of PAs causing the third group of PAs to operate in a third range that is different than the first range and the second range.

15. The satellite of claim 9, wherein the first group of PAs comprises a first power amplifier that operates at a lowest power level for the first group of PAs, wherein the second group of PAs comprises a second power amplifier that operates at a highest power level for the second group of PAs, wherein the second power amplifier operates at a higher energy efficiency than the first power amplifier.

16. The satellite of claim 9, wherein at least a portion of the second group of PAs operate at a higher energy efficiency than at least a portion of the first group of PAs.

17. The satellite of claim 9, wherein the first type is a Class AB power amplifier and the second type is a different class than the first type.

18. A communication system comprising:
an array antenna;
one or more digital beamforming (DBF) devices with processing logic for amplitude tapering electromagnetic energy radiated by the array antenna, the DBF devices comprising digital phase shifters; and
radio frequency front-end (RFFE) circuitry coupled to the one or more DBF devices, wherein the RFFE circuitry comprises:
a first group of power amplifiers that operate with a first peak power level; and
a second group of power amplifiers that operate with a second peak power level, wherein the digital phase shifters generate a first set of signals and a second set of signals, wherein the processing logic:
sends the first set of signals to the first group of power amplifiers causing the first group of power amplifiers to operate in a first range; and
sends the second set of signals to the second group of power amplifiers by causing the second group of power amplifiers to operate in a second range.

19. The communication system of claim 18, wherein:
the first group of power amplifiers comprises a power back-off parameter that is set to a first power level; and
the second group of power amplifiers comprises a power back-off parameter of that is set to a second power level.

20. The communication system of claim 19, wherein the first power level and the second power level are different power levels.

* * * * *